US011628847B2

(12) United States Patent
Swift et al.

(10) Patent No.: US 11,628,847 B2
(45) Date of Patent: *Apr. 18, 2023

(54) VEHICLE-INITIATED CADENCED OPERATOR INTERACTION

(71) Applicant: Crown Equipment Corporation, New Bremen, OH (US)

(72) Inventors: Philip W. Swift, Oakwood, OH (US); Sebastian Theos, Vaterstetten (DE); Luying Sun, Munich (DE); Christian Molnar, Forstinning (DE); James Kraimer, Munich (DE)

(73) Assignee: Crown Equipment Corporation, New Bremen, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/305,965

(22) Filed: Jul. 19, 2021

(65) Prior Publication Data

US 2021/0339756 A1 Nov. 4, 2021

Related U.S. Application Data

(63) Continuation of application No. 16/856,657, filed on Apr. 23, 2020, now Pat. No. 11,066,077.

(Continued)

(51) Int. Cl.
*B60W 40/09* (2012.01)
*B60W 50/10* (2012.01)
(Continued)

(52) U.S. Cl.
CPC .......... *B60W 40/09* (2013.01); *B60W 50/10* (2013.01); *B60W 2040/0818* (2013.01);
(Continued)

(58) Field of Classification Search
CPC ........ B60W 2040/0818; B60W 40/09; B60W 2040/0872; B60W 50/10; G07C 3/00; G07C 5/08
See application file for complete search history.

(56) References Cited

U.S. PATENT DOCUMENTS 6,076,028 A * 6/2000 Donnelly .............. B60R 21/013
701/45
10,663,955 B2 * 5/2020 Kuikka ............ G05B 19/41815
(Continued)

OTHER PUBLICATIONS

International Search Report and Written Opinion of the International Searching Authority dated Jun. 16, 2020; International Application No. PCT/US2020/029555; European Patent Office; Rijswijk, Netherlands.
(Continued)

*Primary Examiner* — Mirza F Alam
(74) *Attorney, Agent, or Firm* — Stevens & Showalter LLP

(57) ABSTRACT

A vehicle-initiated cadenced operator interaction system introduces an operational concept to a vehicle operator via a machine-initiated interaction. Thereafter, interaction is initiated by the industrial vehicle according to a cadence that provides a gap between interactions so that the operator can demonstrate the behavior associated with the introduced concept. Industrial vehicle data associated with the content of the interaction(s) is analyzed and evaluated against predefined operational criteria to determine whether the operator is demonstrating the appropriate skill/behavior associated with the interaction(s). Responsive to the operator's demonstrated ability, the system can modify operation of the vehicle to tune the industrial vehicle to the operator. The system can also extend to the operating environment, by
(Continued)

interacting with electronic devices, vehicles, machines, etc., in the operating environment to tune the environment to the operator.

22 Claims, 9 Drawing Sheets

Related U.S. Application Data

(60) Provisional application No. 62/837,250, filed on Apr. 23, 2019.

(51) Int. Cl.
*B60W 40/08* (2012.01)
*B66F 9/24* (2006.01)

(52) U.S. Cl.
CPC ............... *B60W 2040/0872* (2013.01); *B60W 2300/121* (2013.01); *B66F 9/24* (2013.01)

(56) References Cited

U.S. PATENT DOCUMENTS

| 11,066,077 B2 | 7/2021 | Swift et al. |
| 2009/0099897 A1* | 4/2009 | Ehrman ................. G06Q 10/06 705/7.15 |
| 2010/0039247 A1* | 2/2010 | Ziegler .................... G07C 5/08 340/436 |
| 2019/0023206 A1* | 1/2019 | Yoshida ............. B60R 21/0136 |

OTHER PUBLICATIONS

Office Action dated Dec. 15, 2020; U.S. Appl. No. 16/856,657; United States Patent and Trademark Office; Alexandria, Virginia.
International Preliminary Report on Patentability and Written Opinion of the International Searching Authority dated Sep. 28, 2021; International Application No. PCT/US2020/029555; International Bureau of WIPO; Geneva, Switzerland.
Notice of Allowance dated Mar. 22, 2021; U.S. Appl. No. 16/856,657; United States Patent and Trademark Office; Alexandria, Virginia.

* cited by examiner

VEHICLE-INITIATED CADENCED OPERATOR INTERACTION

CROSS REFERENCE TO RELATED APPLICATIONS

This application is a continuation of U.S. patent application Ser. No. 16/856,657, filed Apr. 23, 2020, entitled "VEHICLE-INITIATED CADENCED OPERATOR INTERACTION", now allowed, which claims the benefit of U.S. Provisional Patent Application Ser. No. 62/837,250, filed Apr. 23, 2019, entitled "VEHICLE-INITIATED CADENCED OPERATOR INTERACTION", the disclosures of which are hereby incorporated by reference.

BACKGROUND

Wireless strategies are deployed by various enterprises to improve the efficiency and accuracy of operations. Wireless strategies may also be deployed to avoid the insidious effects of constantly increasing labor and logistics costs.

For instance, in a typical warehouse implementation, a forklift truck is equipped with a communications device that links a corresponding forklift truck operator to a management system executing on an associated computer enterprise via a wireless transceiver. Essentially, the communications device is used as an interface to the management system to direct the tasks of the forklift truck operator, e.g., by instructing the forklift truck operator where and/or how to pick, pack, put away, move, stage, process or otherwise manipulate items within a facility.

BRIEF SUMMARY

According to an embodiment of the present disclosure, a computer-implemented process for cadenced operator interaction is provided. The process is carried out in an industrial environment. Particularly, the process comprises loading into memory, an interaction profile that characterizes an operator action that is implemented while operating the industrial vehicle. Here, the interaction profile includes a rule defining a measure of performance associated with the operator action, as well as a target response to the measure of performance. The process also comprises loading into memory, a cadence. The cadence defines an interval between interactions associated with the operator action of the interaction profile. The process also comprises performing ongoing monitoring. Ongoing monitoring is carried out by monitoring information electronically collected by the industrial vehicle, and performing, responsive to detecting first data within the monitored information corresponding to the operator action, a set of tasks. The set of tasks include applying select components of the monitored information against the rule to define a performance response, and generating performance feedback based upon a comparison of the performance response to the target response, saving the performance feedback in a profile history. The tasks also include detecting, based upon the cadence, whether an observation event is due, and communicating a message of the industrial vehicle based upon the profile history at a time established by the cadence.

According to further aspects of the present disclosure, a computer-implemented process for vehicle-initiated cadenced operator interaction is provided. The process comprises loading into memory, an interaction profile that is associated with an operator action that is implemented while operating the industrial vehicle. The interaction profile includes a rule defining a measure of performance associated with the operator action, and a target response to the measure of performance. The process also comprises loading into memory, a cadence, where the cadence defines an interval between interactions associated with the operator action of the interaction profile. Yet further, the process comprises performing ongoing monitoring by monitoring information communicated across a vehicle network bus, and defining a performance calculation based upon identifying data from the monitored information as satisfying the operator action. Performing ongoing monitoring also comprises comparing the performance calculation to the target response, and generating performance feedback based upon the comparison. Still further, performing ongoing monitoring comprises detecting, based upon the cadence, whether an observation event is due, and outputting the performance feedback when the observation event is due, otherwise suppressing the performance feedback.

According to still further aspects of the present disclosure, a computer-implemented process for providing performance feedback of an industrial vehicle is provided. The process comprises loading into memory, an interaction profile that is associated with an operational feature that is implemented while operating the industrial vehicle. The interaction profile includes a rule defining a measure of performance associated with the operational feature, and a target response to the measure of performance. The process also comprises performing ongoing monitoring by evaluating the rule by monitoring data communicated across the vehicle bus determined to be associated with the operational feature to define a performance calculation. Performing ongoing monitoring also comprises outputting a performance feedback when an observation event is due based upon a cadence, where the performance feedback is generated based upon a comparison of the performance calculation to the target response. Performing ongoing monitoring still further comprises suppressing the performance feedback when the observation event is not due based upon the cadence.

DETAILED DESCRIPTION

Figure 1:
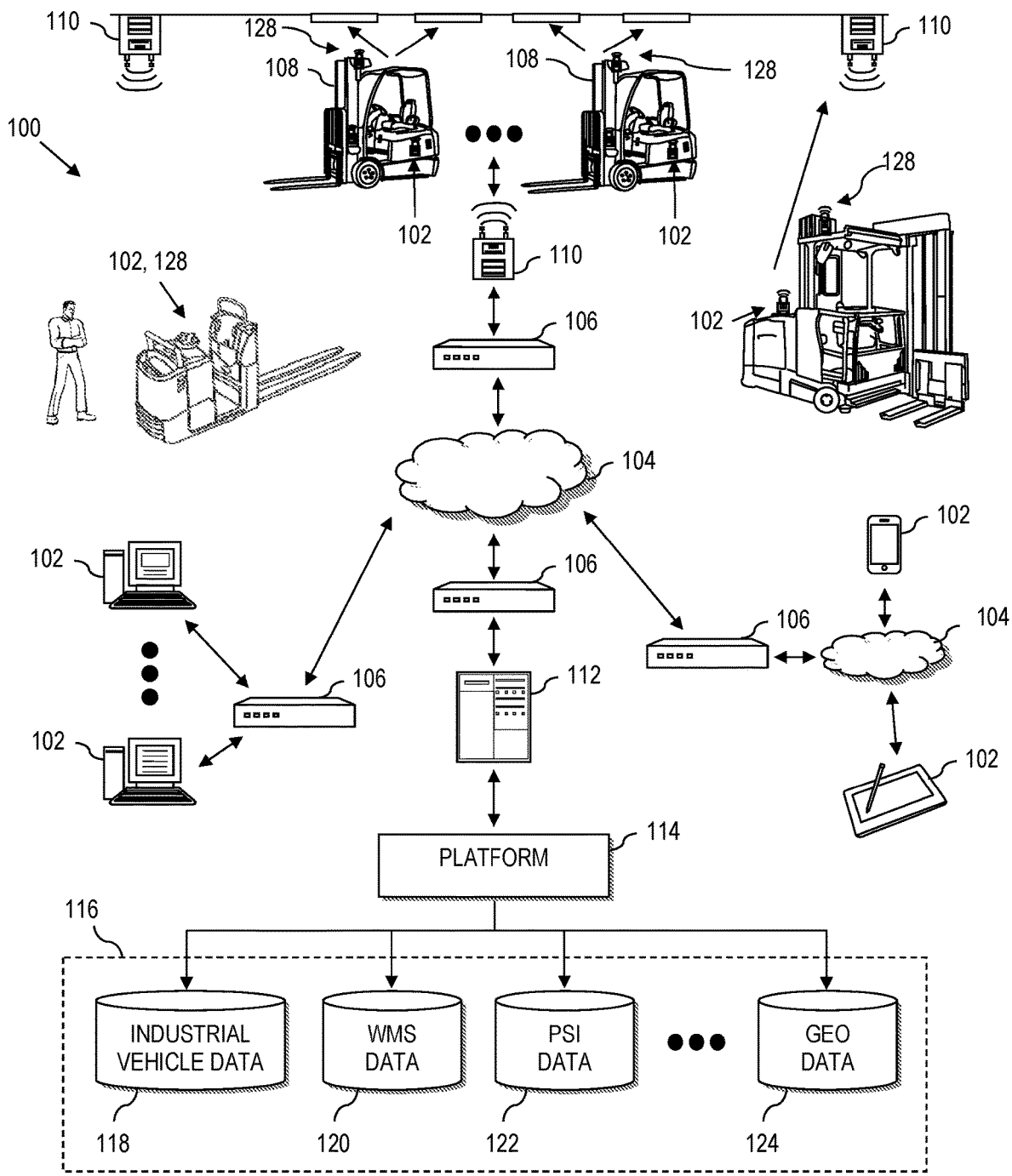
FIG. 1 is a block diagram of an industrial system, according to aspects of the disclosure.

An industrial vehicle operator is typically expected to operate an industrial vehicle under a variety of different conditions, and in a diverse array of environments. Further, an industrial vehicle typically includes many different technology features that an operator must be able to understand and navigate with skill. Example technical features of an industrial vehicle include, but are not limited to, a traction system to control a travelling speed of the vehicle, a steering system to control a direction in which the vehicle travels, a load handling system to control the load handling features of the vehicle, a communication system to control interaction with a wireless environment, an instrument cluster and/or display, which can present operational information, vehicle information, task information, or combinations thereof, etc.

Each technology feature of an industrial vehicle requires considerable training and/or skill for the operator to be able to use the feature correctly and efficiently. Moreover, in some instances, technology features can be blended into enhanced operations by operating two or more technology features together (e.g., simultaneously, in tandem, in sequence, etc.). The above considerations translate into a large amount of time-consuming effort, which may include self-teaching, trial-and-error, peer-to-peer observation and interaction, classroom and other teaching events, etc. In this regard, the correct or incorrect usage of technology features can often have dramatic benefits or consequences in industrial vehicle usage.

Modern industrial vehicles are increasingly pushing limits to measures of work, e.g., in terms of lift height, maximum load weight, speed of travel, etc. While such improvements are generally favorable, improper operation of an industrial vehicle can have mechanical consequences (e.g., increased mechanical wear, which may result in the need for more frequent planned maintenance, etc.) and electrical consequences (e.g., which may lead to premature battery wear, inefficient energy consumption, need for frequent or increased battery charges, poor battery state of health, etc.).

However, aspects herein provide a distinctive technical feature that can lead to improved life of the industrial vehicle and/or vehicle components, increased durability, and improved industrial vehicle efficiency (e.g., improved energy conservation, less time in maintenance, improved ratio of energy consumed to work performed, etc.) by providing vehicle-initiated cadenced operator interactions.

In examples discussed more fully herein, vehicle-initiated cadenced operator interactions are generated by an industrial vehicle to bring about personalized and spaced operator learning, coaching, teaching, instruction, observation, feedback, other information exchanges, or combinations thereof. Vehicle-initiated cadenced operator interactions include interactions that are independent of normal industrial vehicle operation, as well as interactions that are in real-time with normal vehicle operation. Thus, in an example application, the industrial vehicle can teach the operator on how to best work with the industrial vehicle.

The vehicle-initiated cadenced operator interaction system then evaluates industrial vehicle data to determine whether the operator properly demonstrates the taught skill. The operator interactions that result from the vehicle-initiated cadenced operator interactions, and the corresponding evaluated industrial vehicle data, bring about dynamic modification of the industrial vehicle itself, such that the capabilities, limits, features, etc., of the industrial vehicle dynamically "tune" to the operator. Yet further, the operator interactions that result from the vehicle-initiated cadenced operator interactions can bring about dynamic changes to electronic devices, other vehicles, machines, etc., that are in the vicinity of the industrial vehicle to dynamically "tune" the working environment to the operator. Accordingly, the vehicle-initiated cadenced operator interaction system can modify the vehicle itself, the operating environment, or both to tune to the operator, modify operator behavior to gain improved industrial vehicle operation, a combination thereof, etc.

Brief Introduction

A vehicle-initiated cadenced operator interaction system as disclosed herein, initially presents a skill, teaches a feature, or otherwise introduces an operational concept to a vehicle operator. In many contexts, this interaction occurs via operator interaction with a graphical user interface on the industrial vehicle. However, interactions can also be carried out on remote devices, e.g., a tablet, smartphone, etc. The initial interaction can occur at a time such as when the vehicle is stopped so that the user can focus attention to the interaction.

Thereafter, interaction is initiated by the industrial vehicle according to a cadence. The cadence provides an interval (e.g., a time gap) between interactions so that the operator can demonstrate the skills, behavior, etc., associated with the previous interaction(s). The interval can vary or the interval can be fixed. For instance, the cadence can be based upon time, events, or a combination thereof. The vehicle controller can also, independent of the cadence, provide information to the operator in real-time, e.g., to provide real-time feedback to the operator as to operations that the vehicle-initiated cadenced operator interaction system has trained the operator on, e.g., to provide quick positive reinforcements, negative reinforcements, etc.

In some implementations, the spacing of the cadence can be preset. Alternatively, the spacing of the cadence can be dynamically determined by the system to bring about the interaction at a timing that is personalized for the operator. In this regard, the computer system can converge on a cadence that is unique to each particular vehicle operator to provide not only context appropriate interactions, but also timing/spaced appropriate interactions, which can include the introduction of new concepts, relearning, positive reinforcement of learned behavior, negative reinforcement of incorrect behavior, etc.

The intelligence of the industrial vehicle system allows a vehicle controller to establish the content of an interaction, and the cadence of interactions, independent of a current environment. For instance, the vehicle controller, at a cadenced interval, can interact with the operator in regard to a subject that the operator is not yet trained, to reinforce a previously trained capability, to react to an electronically derived observation of an operator response to an event, to provide reinforcement in response to an event, to provide instruction to respond to an event predicted to occur in a short term, to identify a misuse, non-ideal use, or non-expected use of the vehicle that impacts vehicle performance, etc.

The vehicle controller then actively monitors and analyzes machine generated industrial vehicle data to resolve monitored data into industrial vehicle activities associated with the content of the interaction(s). The monitored activities are evaluated against pre-defined operational criteria (e.g., desired or otherwise optimal performance) to determine whether the operator is demonstrating the appropriate skill/behavior associated with the interaction(s).

Yet further, responsive to the operator's demonstrated ability to operate the industrial vehicle, the vehicle-initiated cadenced operator interaction system can take machine control of the vehicle, modify operation of the vehicle, implement performance tuning, combinations thereof, etc., examples of which are set out in greater detail herein. Thus, operator demonstrated skill can drive tuning of the industrial vehicle for better performance, more capabilities, lower vehicle performance, less vehicle capabilities, etc. The vehicle-initiated cadenced operator interaction system can also extend to the operating environment, by interacting with electronic devices, vehicles, machines, etc., in the operating environment of the industrial vehicle (e.g., in the vicinity of the working location of the industrial vehicle) to send messages, take control, modify operation, combinations thereof, etc., examples of which are set out in greater detail herein.

Vehicle-initiated cadenced interactions thus drive the operator's knowledge, skill, education, and familiarity with regard to the industrial vehicle and/or the industrial vehicle's operating environment while controlling the industrial vehicle, environment, or both, in a manner consistent with the operator's skill operating the industrial vehicle. Thus, the vehicle-initiated cadenced operator interaction system can tune an industrial vehicle and/or operating environment to the operator, and/or can likewise tune the operator to the industrial vehicle, operating environment, or a combination thereof.

In some embodiments, the system can determine the personal need for certain topics to be taught, determine the personal temporal and/or event based spacing between questions, training, observations, and reinforcements, incorporate a learning algorithm on the industrial vehicle, combinations thereof, etc., in a "live" feedback situation.

As such, the operator has the possibility to learn at all times, because the learning platform on the industrial vehicle is with the operator all the time. This also means that the industrial vehicle coaches the operator in a continual manner, allowing for automated observation, reinforcement, intervention, and combinations thereof, to improve operation of the industrial vehicle. Correspondingly, a trainer could only teach one operator at one specific point in time. An ancillary result is an improvement in operator knowledge, skill, and familiarity with regard to the industrial vehicle and/or the industrial vehicle's operating environment. Moreover, the industrial vehicle, operating environment, combinations thereof, etc., are controlled commensurate with the operator demonstrated skill. Other technical effects, technical problems and corresponding technical solutions are set out in greater detail herein.

In this regard, while operator training, operator behavior modification, and operator compliance to environmental rules and procedures are achievable, such benefits are consequential to the technical solution that results in improved industrial vehicle performance, which can be measured in mechanical/physical gains (e.g., improved use of remote control, blending, and/or other features provided on or with the industrial vehicle, less vehicle wear and maintenance, etc.) and in electrical gains (e.g., increased energy conservation, improved battery health, etc.).

System Overview

Referring now to the drawings and in particular to FIG. 1, a general diagram of a system 100 is illustrated according to various aspects of the present disclosure. The system 100 is a special purpose (particular) computing environment that includes a plurality of hardware processing devices 102 that are linked together by one or more network(s) 104.

The network 104 provides communications links between the various processing devices 102 and may be supported by networking components 106 that interconnect the processing devices 102, including for example, routers, hubs, firewalls, network interfaces, wired or wireless communications links and corresponding interconnections, cellular stations and corresponding cellular conversion technologies (e.g., to convert between cellular and TCP/IP, etc.). Moreover, the network(s) 104 may comprise connections using one or more network configurations, examples of which include intranets, extranets, local area networks (LAN), wide area networks (WAN), wireless networks (WiFi), the Internet, including the world wide web, cellular and/or other arrangements for enabling communication between the processing devices 102, etc.

A processing device 102 can be implemented as a server, personal computer, laptop computer, netbook computer, tablet, purpose-driven appliance, special purpose computing device, personal data assistant (PDA) processor, palm computer, cellular device including cellular mobile telephone, smartphone, an information processing device on an industrial vehicle, an information processing device on a machine (fixed or mobile) in the environment, or other device capable of communicating over the network 104.

Particularly, a processing device 102 is provided on one or more industrial vehicles 108 such as a forklift truck, reach truck, stock picker, automated guided vehicle, turret truck, tow tractor, rider pallet truck, walkie stacker truck, etc. In the example configuration illustrated, a processing device 102 on an industrial vehicles 108 wirelessly communicates through one or more access points 110 to a corresponding networking component 106, which serves as a connection to the network(s) 104. Alternatively, the industrial vehicles 108 can be equipped with cellular or other suitable wireless technology that allows the processing device 102 on the industrial vehicle 108 to communicate directly with a remote device (e.g., over the network(s) 104).

The system 100 also includes a processing device implemented as a server 112 (e.g., a web server, file server, and/or other processing device) that supports a platform 114 and corresponding data sources (collectively identified as data sources 116). The platform 114 can be utilized to carry out components of a personalized spaced interaction system, as described more fully herein.

In the illustrative example, the data sources 116, which need not be co-located, include databases that tie processes executing for the benefit of an enterprise, from multiple, different domains. In the illustrated example, data sources 116 include an industrial vehicle information database 118 that collects data from the operation of the industrial vehicles 108, e.g., in an industrial vehicle domain. Data sources 116 also include a management system 120, e.g., a warehouse management system (WMS). The WMS relates information to the movement and tracking of goods within the operating environment in a WMS domain. Moreover, data sources 116 include a personalized spaced interaction system (PSI) 122 supporting processes executing in a personalized spaced interaction domain, i.e., spaced on-vehicle interactions, as described more fully herein. Still further, data sources 116 can include a geo-feature management system 124 (supporting processes that utilize environmental-based location tracking data of industrial vehicles in a geo-domain), etc. The above list is not exhaustive and is intended to be illustrative only.

Industrial Vehicle

Figure 2:
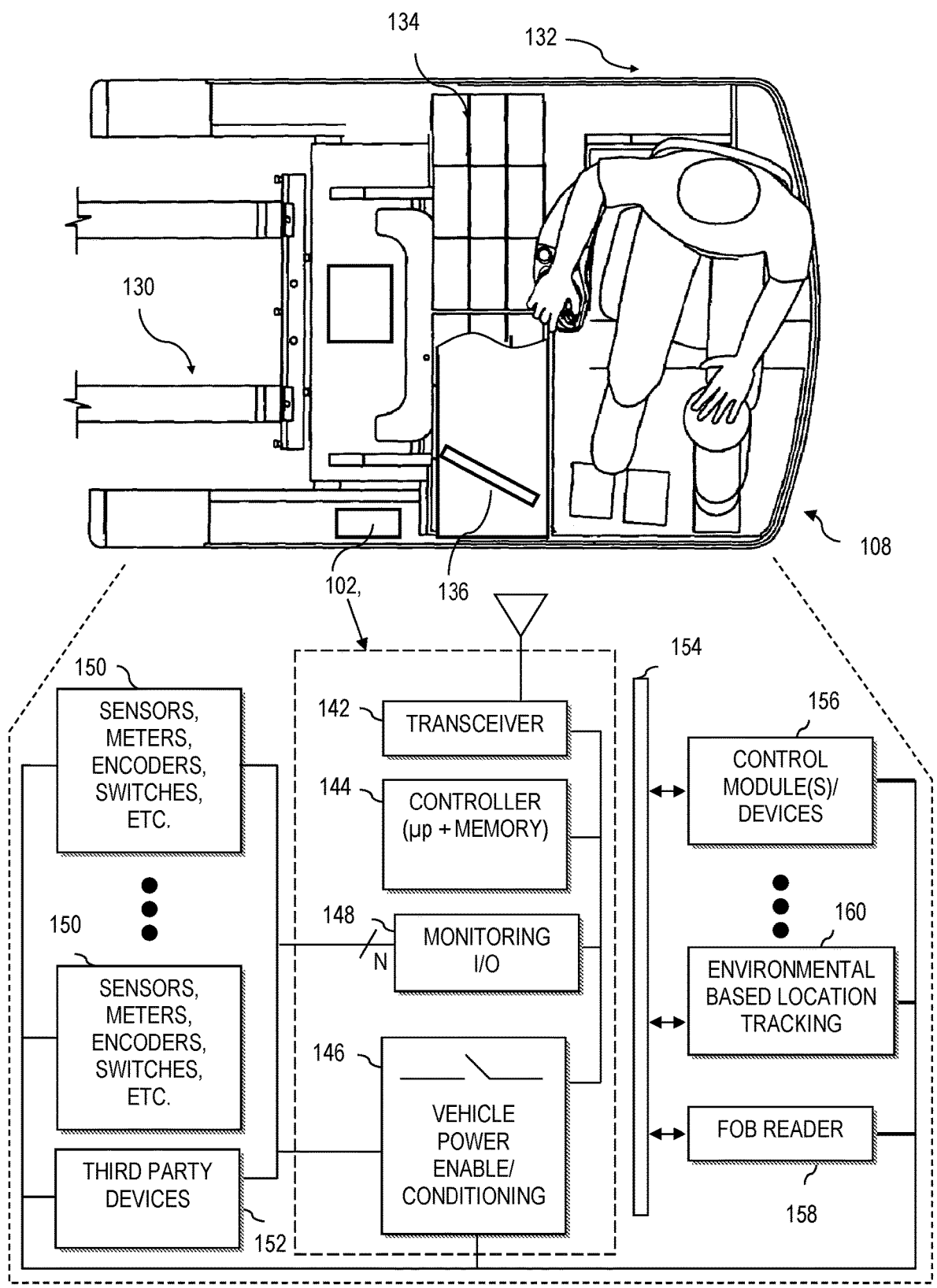
FIG. 2 is a block diagram of a system of electronics on an industrial vehicle such as a forklift truck, walkie, etc., according to aspects of the present disclosure.

Referring to FIG. 2, an industrial vehicle 108 includes conventional features including a load handling feature 130 such as forks, a bed or platform, a tow capability, etc. The industrial vehicle can also optionally include an operator compartment 132, battery compartment 134, display 136, etc.

The display 136 can be a vehicle display that displays at least one gauge that represents a state of the industrial vehicle, e.g., as part of an instrument cluster, vehicle integrated display, etc. Alternatively, the display can be provided uniquely for the processes described more fully herein.

The specific features of the industrial vehicle 108 will vary depending upon the style of vehicle. As noted with regard to FIG. 1, one or more industrial vehicles 108 include a processing device 102 that is implemented as a special purpose, particular computer. In FIG. 2, an information linking device 102 that mounts to or is otherwise integrated with the industrial vehicle 108, can implement an example of a processing device 102 described with reference to FIG. 1.

The information linking device 102 comprises the necessary circuitry to implement wireless communication, data and information processing, and wired (and optionally wireless) communication to components of the industrial vehicle 108, and across the network 104. As a few illustrative examples, the information linking device 102 includes a transceiver 142 for wireless communication. Although a single transceiver 142 is illustrated for convenience, in practice, one or more wireless communication technologies may be provided. For instance, the transceiver 142 communicates with a remote server, e.g., server 112 of FIG. 1, via 802.11.xx across the access points 110 of FIG. 1. The transceiver 142 may also optionally support other wireless communication, such as cellular, Bluetooth, infrared (IR), ultra-wide band (UWB), or any other technology or combination of technologies. For instance, using a cellular to IP bridge the transceiver 142 can use a cellular signal to communicate directly with a remote server, e.g., a manufacturer server across a network 104 (FIG. 1).

The illustrated information linking device 102 also comprises a controller 144, having a processor coupled to memory for implementing computer instructions, including computer-implemented processes, or aspects thereof, as set out and described more fully herein. The controller 144 utilizes the transceiver 142 to exchange information with the remote server 112 (FIG. 1) for controlling operation of the industrial vehicle 108, for remotely storing information extracted from the industrial vehicle 108, etc., for carrying out the vehicle-initiated cadenced interactions described herein, etc.

The information linking device 102 further includes power enabling circuitry 146 controlled by the controller 144 to selectively enable or disable the industrial vehicle 108 (or alternatively, to selectively enable or disable specific control modules, devices, or vehicle functions such as hydraulic, traction, etc.). For instance, the controller 144 can control the industrial vehicle power enabling circuitry 146 to provide power to the industrial vehicle 108, to provide power to select components of the industrial vehicle 108, to provide power for select vehicle functions, etc., based upon operator login, detected geo-features, etc.

Still further, the information linking device 102 includes a monitoring input/output (I/O) monitor 148 to communicate via wired or wireless connection to peripheral devices attached to or otherwise mounted on the industrial vehicle 108, such as sensors, meters, encoders, switches, etc. (collectively represented by reference numeral 150). The I/O monitor 148 may also be connected to other devices, e.g., third party devices 152 such as RFID scanners, displays, meters or other devices. This allows the controller 144 to obtain and process information monitored on the industrial vehicle 108.

The information linking device 102 is coupled to and/or communicates with other industrial vehicle system components via a suitable vehicle network bus 154. The vehicle network bus 154 is any wired or wireless network bus or other communications capability that allows electronic components of the industrial vehicle 108 to communicate with each other. As an example, the vehicle network bus 154 may comprise a controller area network (CAN) bus, Local Interconnect Network (LIN), time-triggered data-bus protocol (TTP) or other suitable communication technology. Moreover, in practical applications, the vehicle network bus may comprise multiple busses, each using the same or different technology and/or protocol. For convenience of discussion, the buss(es) will collectively be referred to as "bus".

As will be described more fully herein, utilization of the vehicle network bus 154 enables seamless integration of the controller 144 and other components of the information linking device 102 into native electronics of the industrial vehicle 108. In the example configuration, the controller 144 of the information linking device 102 connects with, understands and is capable of communication with native vehicle electronic components, such as traction controllers, hydraulic controllers, modules, devices, bus enabled sensors, displays, lights, light bars, sound generating devices, headsets, microphones, haptic devices, etc., collectively referred to as control module(s) 156. As such, the controller 144 can modify vehicle performance, e.g., by limiting a maximum travel speed, setting a maximum lift height, lift weight, etc., by communicating set points, performance tuning parameters, etc., to the appropriate control module 156 via the vehicle network bus 154.

The information linking device 102 can also interact with vehicle devices such as a fob reader 158 across the vehicle network bus 154 to facilitate mechanisms that require an operator to log onto a particular industrial vehicle before being authorized to operate the vehicle.

According to yet further aspects of the present disclosure, an environmental-based location tracking device 160 is provided on the industrial vehicle 108. As illustrated, the environmental-based location tracking device 160 is connected to the vehicle electronics via the vehicle network bus 154. As a result, the environmental-based location tracking device 160 can communicate directly with the controller 144, as well as other devices linked to the vehicle network bus 154 of the corresponding industrial vehicle 108. The environmental-based location tracking device 160 enables the industrial vehicle 108 to be spatially aware of its location within a dimensionally constrained environment, e.g., a mapped portion of an industrial enterprise.

In the applications described more fully herein, a conventional technology such as a global positioning system (GPS) is not likely to be effective when the industrial vehicle 108 is operated indoors. However, the environmental-based location tracking device 160 can comprise a local awareness system that utilizes markers, including fiducial markers, RFID, beacons, lights, or other external devices to allow spatial awareness within the industrial (e.g., warehouse, manufacturing plant, etc.) environment. Moreover, local awareness can be implemented by machine vision guidance systems, e.g., using one or more cameras or other devices. The environmental-based location tracking device 160 may also/alternatively use transponders and triangulation calculations to determine position. Yet further, the environmental-based location tracking device 160 can use combinations of the above and/or other technologies to determine the current (real time) position of the industrial vehicle 108. As such, the position of the industrial vehicle 108 can be continuously ascertained (e.g., every second or less) in certain implementations. Alternatively, other sampling intervals can be derived to continuously (e.g., at discrete defined time intervals, periodic or otherwise constant and recurring time intervals, intervals based upon interrupts, triggers or other measures) determine industrial vehicle position over time.

The environmental-based location tracking device 160 can also use knowledge read from inertial sensors, vehicle sensors, encoders, accelerometers, gyroscopes, etc., (e.g., via the control modules 156 across the vehicle network bus 154, via sensors 150 and/or third party devices 152 across the I/O monitor 148 and vehicle network bus 154, etc.) to determine the position of the industrial vehicle 108 within the industrial enterprise and/or to augment or modify the position determination from the location tracking device 160.

As will be described more fully herein, the controller 144 can execute computer code to carry out the vehicle-initiated operator interactions, including for example, cadenced operator interactions, personalized cadenced operator interactions, etc. Vehicle-initiated interactions can be carried out, for instance, by the controller 144 communicating with the vehicle operator via the display 136 and/or other input/output devices (e.g., lights, speaker, haptic device, etc.). Vehicle-initiated interactions can further be carried out, for instance, by the controller 144 interacting with a remote device (e.g., server 112, platform 114, data sources 116, etc.). Vehicle-initiated interactions can still further be carried out, for instance, by the controller 144 interacting with vehicle components via the I/O monitor 148 (e.g., sensors, meters, encoders 150, third party devices 152). Yet further, vehicle-initiated interactions can be carried out, for instance, by the controller 144 interacting with components across the vehicle network bus 154, e.g., by interacting with control modules 156, fob reader 158, environmental based location tracking 160, combinations thereof, etc. The controller 144 can also interact with electronic devices in the vicinity of the industrial vehicle 108 via direct communication (e.g., Bluetooth, UWB, etc.) or via interaction with the server 112, which then communicates with remote devices in the vicinity of the industrial vehicle 108.

Spaced Interaction System

In an example embodiment, both classroom training and personalized and/or directed coaching are supported by machine-based (e.g., vehicle-initiated) training, observation, reinforcement or combinations thereof. In particular, a computer-implemented process implements a vehicle-initiated cadenced operator interaction system that can reside and execute on an industrial vehicle 108, or on an industrial vehicle 108 interacting with a remote computer (e.g., server 112, FIG. 1).

In a practical implementation, the industrial vehicle 108 has hardware (e.g., controller 144, FIG. 2) that is communicably coupled to a user interface (e.g., which can be presented to the user via the display 136, FIG. 2 and/or other input/output devices). In general terms, the vehicle controller interacts with the vehicle operator through the user interface to teach the operator on how to best work with the industrial vehicle 108.

Figure 3:
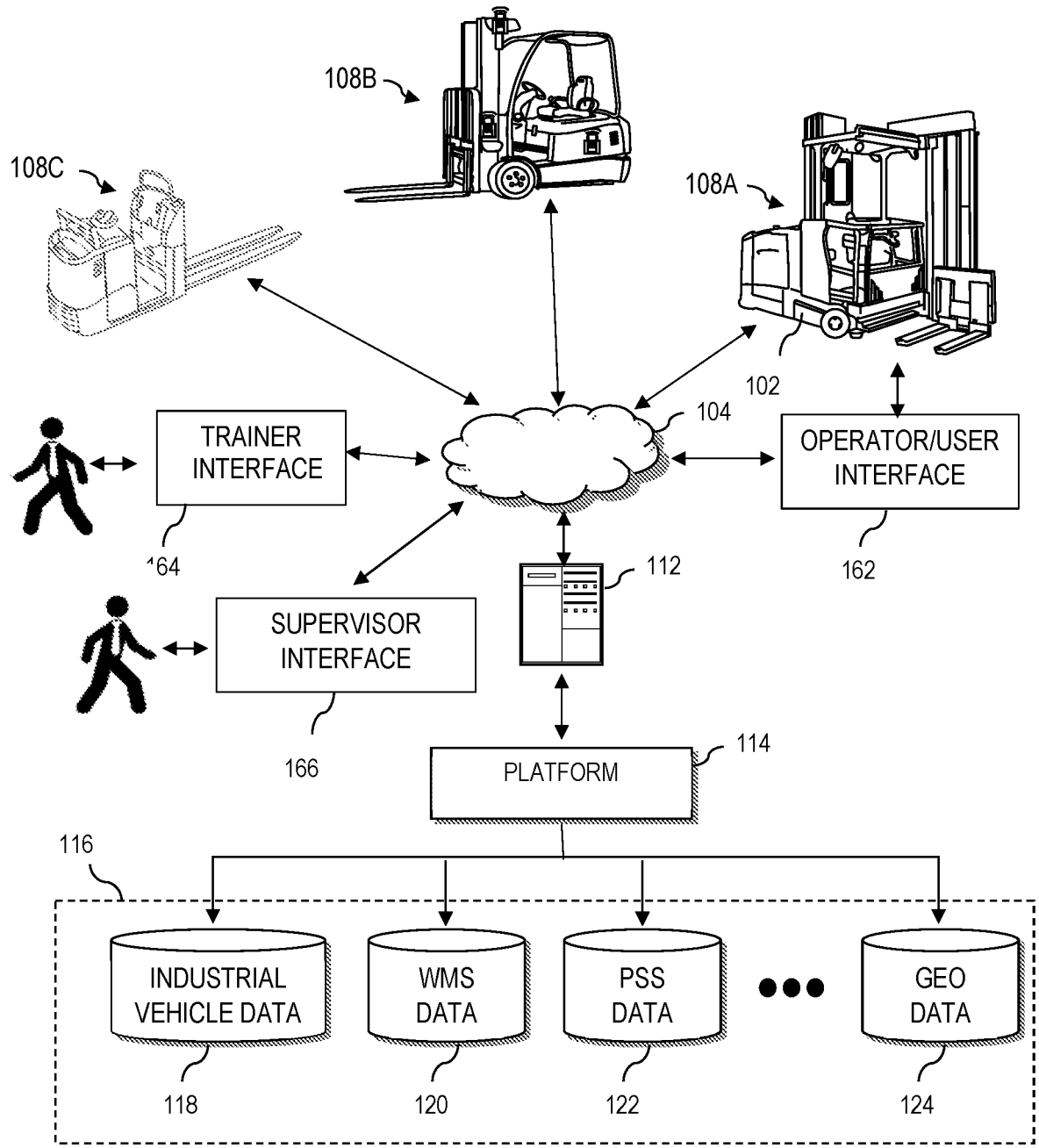
FIG. 3 is a block diagram of a system for performing spaced interactions.

Referring to FIG. 3, a block diagram illustrates an environment that facilitates vehicle-initiated cadenced operator interaction. In general, the system shown in FIG. 3 can include any combination of components described with reference to FIG. 1 and/or FIG. 2. For clarify of discussion, the system includes a network 104 across which a server 112 executing a personalized spaced interaction platform 114 communicates with remote devices. The platform 114 also interacts with data sources 116, which can include by way of example, industrial vehicle data 118, warehouse management data 120, personalized space interaction data (PSI data) 122, geo-data 124, etc., as described more fully herein.

To ensure high training success rates and improved operator compliance with vehicle operations, environmental restrictions, etc., the system comprises an operator interface 162. In practice, the operator interface 162 can be presented as a graphical user interface on the vehicle display while the operator is logged into a corresponding industrial vehicle, e.g., via the information linking device 102 and display 136 (FIG. 2); on a processing device 102 (described with reference to FIG. 1), combinations thereof, etc. This enables the system to generate operator-facing behavior feedback messages, e.g., while the vehicle operator is on the vehicle. The system, via the operator interface 162 can also implement an operator-facing performance tracker dashboard.

In an example embodiment, a trainer interface 164 provides a trainer-facing operator performance dashboard. In practical applications, the trainer interface 164 can be implemented as a graphical user interface executed on a processing device 102 (FIG. 1), such as a desktop computer, tablet, etc. A trainer may also be a vehicle operator, and in this regard the trainer interface 164 may also/alternatively be implemented on a display of an industrial vehicle 108. The platform 114 can also communicate directly with industrial vehicles 108. As will be described in greater detail herein, the platform can communicate with the industrial vehicle 108A to carry out vehicle-initiated cadenced operator interaction system as described more fully herein. The platform 114 can also communicate with other devices in the vicinity of the industrial vehicle 108A, e.g., by communicating with industrial vehicle 108B and 108C. In practice, the platform 114 can communicate with any electronic devices in the environment of the industrial vehicle 108A that is configured to receive commands and/or messaging from the platform 114. Thus, the platform 114 can tune the environment to the operator of the industrial vehicle 108A, examples of which are described more fully herein. As an alternative or in lieu of the above, the industrial vehicle 108A can directly communicate with other devices, e.g., industrial vehicle 108B and industrial vehicle 108C via Bluetooth, UWB, or other local communication technology to carry out operator tuning of the working environment in the vicinity of the operator.

A trainer interface 164 enables a user such as a manager or trainer to interact with the system, e.g., to load, program, configure, modify, etc., the experience (e.g., cadence of learning, topics of interaction, etc.) for vehicle operators. The trainer interface 164 can also be utilized to display training level metrics, e.g., via a dashboard.

The system can also optionally include a supervisor interface 166 that enables a supervisor to view supervisory level dashboard statistics and reports on training progress, e.g., by viewing a supervisor-facing operator and trainer performance dashboard. In practical applications, the trainer interface 164 and/or the supervisor interface 166 can be implemented as a graphical user interface executed on a processing device 102 (FIG. 1), such as a desktop computer, tablet, etc.

Vehicle-Initiated Messages, Control, or Combination Thereof

The system herein monitors operator knowledge via interactions with the vehicle operator and the industrial vehicle electronics. The system can also learn about the extent of operator knowledge and/or skill, or both monitor knowledge and learn knowledge of the operator.

Moreover, the system determines whether the operator knowledge is transformed into desired operator behavior by monitoring industrial vehicle usage against the desired operator behavior(s). Yet further, the system changes the operator behavior (when the measured behavior deviates from the desired operator behavior), e.g., through reinforcement, timely in-process live training, messaging, and other feedback. Thus, an industrial vehicle, e.g., via the vehicle-initiated system, helps to make better vehicle operators.

In some embodiments, the industrial vehicle 108 learns about the knowledge and/or skill of the operator, e.g., by learning limits/capabilities of the operator. This allows the industrial vehicle 108 to dynamically adjust the vehicle operating characteristics to adapt to the skill of the operator, e.g., by altering set points, setting speed restrictions, hydraulics restrictions, lift restrictions, combinations thereof, etc.

As an example, by monitoring operator interaction with the presented prompts on the display, the system evaluates the operator's input and sets at least one industrial vehicle internal operating state (e.g., setpoint for maximum speed, lift height, load weight, etc.). The system then dynamically adjusts the internal operating state of the vehicle over time to tune the industrial vehicle to the operator by monitoring how well the operator operates the vehicle according to the skills presented via the prompts by monitoring usage data generated by the electrical components of the industrial vehicle 108. This can result in prevention of premature component wear, prevent failure, avoid excessive energy consumption, and other shortcomings of improper operation, etc.

Yet further, in some instances, instead of, or in combination with adjusting the industrial vehicle 108, the system can adjust, control, modify, communicate with, etc., electronic devices, machines, vehicles, and other electrical components in the vicinity or working environment of the operator. For instance, the system (e.g., via the platform 114 and/or direct communication by the industrial vehicle 108) can warn other industrial vehicle operators (e.g., by communicating a message to nearby industrial vehicles that is presented on an operator display) that an operator in training is driving down the same aisle as the other vehicle operators. As another example, the system can control other industrial vehicles, e.g., by sending a command to the nearby industrial vehicles to implement lane avoidance, to implement a minimum passing distance, set a temporary maximum speed, maximum lift height, sound a horn, turn on a light, set a temporary geo-zone, combination thereof, etc. As such, in some embodiments, not only is the industrial vehicle 108 of the operator controlled, but the working environment in the vicinity of the operator is controlled in an orchestrated manner.

In an example implementation, the operator interface 162 is utilized to provide vehicle-initiated messages to the vehicle operator. The vehicle-initiated messages can be provided while the operator is operating a corresponding industrial vehicle, or while the operator is not actively using the vehicle, e.g., performing training/learning on a computer, tablet, smartphone, etc.

Referring briefly to FIG. 1, FIG. 2 and to FIG. 3, by way of example, the controller 144, via the display 136, presents information to the vehicle operator. As an example, the display 136 can present training material on an industrial vehicle feature, and then test the knowledge of the operator, e.g., by presenting a multiple choice question on the display 136. The controller 144 can read an I/O device that enables the user to respond to the question, and uses information stored in memory to determine whether the operator answered the question properly. Moreover, the questions may elicit a behavior, action, control, demonstrate use of a vehicle technical feature, demonstrate knowledge of a vehicle technical limitation, etc. Here, the controller 144 monitors operator interaction with the operator interface 162, and may also monitor data communicated across the vehicle network bus 154 to detect operator activity responsive to the question presented on the display. Thereafter, the controller 144 can detect operator activity during normal, continued use of the industrial vehicle. Based upon monitored data values, the controller 144 can issue positive reinforcement, negative reinforcement, instruction, correction, or other appropriate feedback, in an ongoing manner. Thus, the controller 144 observes operator behavior and provides feedback in a live situation.

In another example implementation, messages are triggered by detected patterns of industrial vehicle data. This enables the system to push training events, then monitor operator behavior, or monitor operator behavior to decide which topics/training to push to the operator.

Regardless, the controller 144 can interface with, and understand vehicle data communicated across the vehicle network bus 154, e.g., data values communicated by control modules, sensors, and other vehicle electronics. The controller 144 can also correlate the vehicle data to the training topics associated with the vehicle-initiated interactions, thus facilitating the automated machine responses described more fully herein.

The controller 144 can also communicate via the transceiver 142 with remote computer systems, e.g., across a wireless interface, e.g., to request that the platform 114 scan records stored in the industrial vehicle data 118 that are keyed to the vehicle operator, etc. Thus, the patterns can be derived by receiving information from a remote source, e.g., the platform 114 (FIG. 1). Moreover, patterns can be derived by a combination of locally determined information and wirelessly received information. The data-patterns can be associated to certain (correct or incorrect) operator behaviors, teaching or training data stored in the PSI data 122, etc. Moreover, patterns that define behavior can be predefined. Alternatively, the industrial vehicle can learn patterns by observing data transmitted across the industrial vehicle network bus, thereby actively building patterns from monitored events. In this regard, building patterns can be carried out by recognizing certain data types, re-ordering data, sorting data, filtering data, or otherwise recognizing combinations of data that correspond with a high probability to an event of interest.

Absolute Control

Comparisons between vehicle operators can typically provide relative differences at best. To the contrary, the system herein can determine absolute characterizations of operator performance. For instance, the system can evaluate a large body of data (e.g., by evaluating data sources 116 across one or more enterprises). For instance, using cloud based storage, a manufacturer may have access to large quantities of data. The data, e.g., extracted from industrial vehicle data 118, PSI data 122, etc., across one or more fleets, can be normalized to rate operators, such as by using a standard deviation distribution. For instance, operators can be rated on a scale of five (5) categories, e.g., trainee, beginner, intermediate, advanced, expert, according to a predetermined distribution. This approach limits those that can be an "expert", due to the distribution. Likewise, this approach allows operators to quickly move from trainee to beginner, and from beginner to intermediate. It will be more difficult to become advanced, and even more difficult to become an expert. Moreover, all operators are normalized against the same scale. In this regard, the system makes decisions on whether the operator is a good, bad, etc. In other implementations, there is no distribution, providing a fixed scale to evaluate operators as they advance from trainee towards expert.

Example User Interface Interactions

As noted herein, at intervals determined by a cadence, the controller 144 interacts with the operator interface 162 to provide instruction, ask questions, provide training information, e.g., via video, text, images, combinations thereof, etc., to present information regarding the operation of the industrial vehicle, instructions on environment operational procedures, etc.

Also as noted herein, from time to time, the controller 144 interacts with other electronics of the industrial vehicle 108 to provide feedback to the operator, e.g., in real time. In an illustrative implementation, the controller 144 can interact with the operator interface 162 to provide at least three types of real-time messages.

A first message is deemed an "approving (green) message", which can appear after one (or multiple repetitions of the same) correct behavior was recorded (e.g., the operator correctly used an industrial vehicle's remote control to move the industrial vehicle 108 for a short distance).

A second message is deemed a "disapproving (red) message", which can appear after one (or multiple repetitions of the same) incorrect behavior was recorded (e.g., the operator incorrectly exited the industrial vehicle while the industrial vehicle was still in motion).

A third message is deemed a "reminder message", which can appear after multiple repetitions of the same allegedly correct or incorrect behavior were recorded. As some data patterns can reoccur in multiple situations with only some being clearly defined as correct or incorrect behaviors, these reminder messages are to create awareness for correct behaviors without the risk of causing operator frustration.

Operator-Facing Performance Tracker Dashboard

According to aspects herein, operators can have immediate access to an overview over their performance through a dashboard on the vehicle-mounted device, e.g., display 136 (FIG. 2), operator interface 162 (FIG. 3), on a tablet, on a laptop off-line, etc. In an example implementation, this dashboard provides three key information sets to the vehicle operator, including usage, compliance, and operation. Non-limiting examples of operator-facing performance tracker information can be used to answer questions such as:

"Am I using a vehicle feature often enough?" (Usage);
"Am I using the vehicle feature correctly?" (Compliance); and
"Am I operating the feature properly?" (Operation).

In an example embodiment, the values indicating operator performance in each of these categories is calculated based on the number of correct and incorrect operator behaviors recorded by the controller 144 interacting with the operator via the display 136, by reading information from the I/O monitor 148, reading information across the industrial vehicle network bus 154, etc. Therefore, operator performance can use the same applications programming interface (API) as the feedback messages visible to the operator.

In some embodiments, additional information is provided, e.g., on how the operator can improve a score in any category. This information is available upon user request and can be accessed through sub-menus within the same tool.

Trainer-Facing Operator Performance Tracker Dashboard

In an example implementation, the trainer interface 164 provides a dashboard view intended for training staff, where the trainer interface 164 uses the same API that also triggers operator feedback messages and generates data for the operator's personal dashboard but combines the values of all trainee-operators associated with an individual trainer. The example dashboard gives three key information sets, including combined trainees, combined trainee compliance, combined trainee operation. Thus, the trainer interface 164 can answer questions such as the following, for trainers:

"Are trainees using a vehicle feature often enough?" (combined trainees' Usage);
"Are trainees using the vehicle feature correctly?" (combined trainees' Compliance);
"Are trainees operating the feature properly?" (combined trainees' Operation).

Through sub-menus or other suitable navigation features, trainers can access individual performance scores for each of their associated trainees pointing out low performers and training topics to concentrate on when approaching an individual trainee order selector. Where trainers can themselves be industrial vehicle operators, this dashboard should be accessible through a vehicle-mounted device, e.g., information linking device 102 and display 136 (FIG. 2).

Supervisor-Facing Operator Performance Tracker Dashboard

The supervisor interface 166 can be implemented as a web-based dashboard and can be accessed by supervisors to provide combined performance information for all associated staff (trainers and operators). The supervisor-facing operator performance tracker dashboard can use the same indicators (usage, compliance and operation) as discussed above. In an example implementation, the supervisor-facing dashboard enables warehouse supervisors and managers to better identify reasons for improper, inefficient, or inaccurate industrial vehicle operation. This can lead to directed improvement of vehicle operation in terms of efficiency, energy, reduced impacts, and other vehicle functional characteristics. This may thus lead to reducing productivity losses as they are believed to directly correlate with missed training opportunities.

Aspects of the present disclosure improve training efforts for technology products with a system-based approach that can reduce manual training effort, provide faster results, keep a high and steady productivity level over time, provide tangible value for customers that will generate long-term engagement, etc.

Vehicle-Initiated Cadenced Operator Interaction System

Personalized Spaced Learning is an approach to teach knowledge and change behavior. Personalized Spaced Learning becomes effective in an industrial environment when implemented as a vehicle-initiated cadenced operator interaction system. As noted herein, this can comprise the industrial vehicle 108 pushing knowledge to the operator, the operator behavior pushing knowledge to the industrial vehicle 108, or a combination thereof. In this regard, an observation can be reached that teaching certain topics can increase knowledge but does not necessarily change behavior. For this, the memorized knowledge needs to be "transformed" into behavior, because ultimately the system needs a change in behavior to become more productive/efficient/better.

The system herein combines industrial vehicle operational data with a graphical user interface on an industrial vehicle 108 (e.g., via the information linking device 102 via the controller 144 communicating with the display 136 to implement the operator interface 162) to "make" better operators, to dynamically change the internal operating state of the vehicle to "make" a better vehicle that is specifically tuned to the current skill/knowledge/capability of the operator, to tune an operating environment that is specifically tuned to the current skill/knowledge/capability of the operator, combinations thereof, etc.

This system-based behavior reinforcement aims to support the human based behavior reinforcement, meaning there could still be classroom training and personal coaching with the industrial vehicle 108.

System-Based Behavior Reinforcement

The system-based behavior reinforcement helps the vehicle operator to transform knowledge into (changed or new) behavior. This comprises a combination of on-truck instruction (e.g., while the truck is stationary) in combination with live feedback from the system, in this case the industrial vehicle, as described more fully herein. For example, in the instant the operator exhibited a wrong behavior for a specific topic, the system can inform the operator immediately. Also, in the instant the operator uses a correct behavior for a specific topic, the vehicle can inform the operator immediately. The system can also select to suppress feedback, e.g., to avoid operator information fatigue.

Algorithm

According to aspects herein, an algorithm performs one or more functions, including by way of example, monitoring industrial vehicle usage data, performing data analysis that controls personalized, spaced messaging, monitoring industrial vehicle data to determine the operator's performance (e.g., pattern matching based upon vehicle data), implementing a feedback cadence for one or more topics based on user performance, adapting the spacing between reinforcement, (new) topics, etc., based on user performance, deciding if the live user behavior was correct or incorrect (based on industrial vehicle data), taking measures for correct or incorrect behavior, combinations thereof, etc.

General Framework for Vehicle-Initiated Cadenced Operator Interactions

Figure 4:
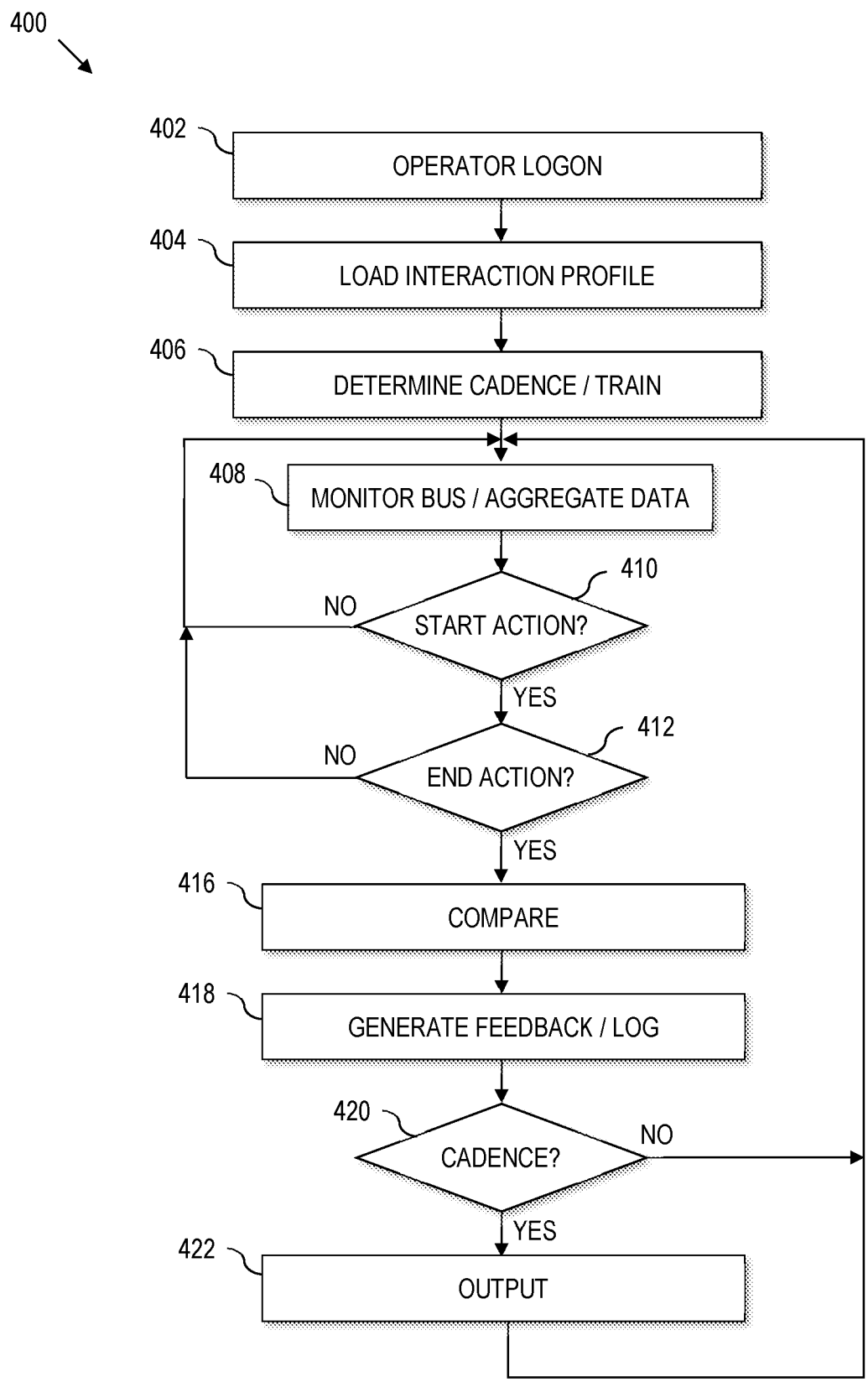
FIG. 4 is a flowchart illustrating a general framework for a vehicle-initiated cadenced operator interaction system, according to aspects herein.

Referring to FIG. 4 (and with general reference back to FIG. 1, FIG. 2, and FIG. 3), an example of a computer-implemented process 400 is illustrated, which implements vehicle-initiated cadenced operator interactions. More particularly, the computer-implemented process 400 is carried out in an environment that includes an industrial vehicle having a user interface communicatively coupled to a vehicle controller, as described more fully herein, e.g., with regard to FIG. 1, FIG. 2, FIG. 3, or combinations thereof. For instance, the process 400 can be carried out by the controller 144 of the information linking device 102 (FIG. 2) interacting with the display 136 (FIG. 2), operator interface 162 (FIG. 3) or combinations thereof. The process may also optionally interact with the platform 114 (FIG. 1) to provide performance feedback of an industrial vehicle 108.

At 402, the process detects, e.g., by a processor on the industrial vehicle, that an operator has entered appropriate login credentials. For instance, with brief reference to FIG. 2, the controller 144 may recognize that an operator attempting to log onto the industrial vehicle has appropriate login credentials by comparing a login received by the fob reader 158 against a stored list of authorized operators. Reference is now drawn back to FIG. 4.

At 404, the process loads into the vehicle controller, an interaction profile. By way of illustration, and not by way of limitation, an example interaction profile includes a pattern having a start action and an end action. For instance, the start action and the end action can be measured, discovered, or otherwise recognized by the controller on the industrial vehicle, by the platform 114 (FIG. 1) or by a combination thereof. Moreover, the pattern is associated with an operator action that can be implemented while operating the industrial vehicle, e.g., to control a technology feature of the industrial vehicle, to control the industrial vehicle according to an environmental procedure (policy), etc.

In some embodiments, the operator action is associated with a definition that characterizes an action that can be implemented while operating the industrial vehicle, such as operating a vehicle technology feature, a control, a vehicle capability, an environment policy or procedure, etc.

The interaction profile also includes a rule defining a measure of performance associated with the pattern, and a target response to the measure of performance.

With brief reference back to FIG. 2, and solely for clarity, a few example interaction profiles are discussed.

For instance, loading into the vehicle controller, an interaction profile at 404 can comprise defining the operator action as an operation using a remote control feature of the industrial vehicle (e.g., a GO button described herein). Here, the process also includes defining the start action and end action of the pattern based upon an operator interacting with the remote control feature of the industrial vehicle, defining the rule as at least one of a travel distance limit, or an operator presence on the industrial vehicle, while using the remote control feature.

As another example, loading into the vehicle controller, an interaction profile at 404 can include defining the operator action as an operation driving the industrial vehicle (e.g., operating a traction control, accelerator, steer control, brake, etc.). Here, the process also includes defining the start action and end action of the pattern based upon an operator interacting with at least one control of the industrial vehicle to drive the industrial vehicle (e.g., accelerator pedal, steering wheel, joystick on a control arm, brake control, and defining the rule as a function of at least one of travel speed, travel distance, acceleration, or braking.

As yet another example, loading into the vehicle controller, an interaction profile at 404 can include defining the operator action as an operation using a load handling feature of the industrial vehicle (e.g., operating a hydraulics component, interacting with a rack height select control, etc.). Here, the process also includes defining the start action and end action of the pattern based upon an operator interacting with at least one control of the industrial vehicle to operate the load handling feature of the industrial vehicle, and defining the rule as a function of at least one of lift height or lift weight.

As still another example, loading into the vehicle controller, an interaction profile at 404 includes defining the operator action as an operation using a blending feature of the industrial vehicle (e.g., actuating a blending control that affects fork lifting/hydraulics with steering and/or vehicle movement/traction control. Here, the process also includes defining the start action and end action of the pattern based upon an operator interacting with at least one control of the industrial vehicle to operate the blending feature of the industrial vehicle, and defining the rule as a function of the blended operational features.

As still further another example, loading into the vehicle controller, an interaction profile at 404, includes defining the operator action as an operation on the industrial vehicle dictated by an environmental procedure (e.g., stop and sound horn at the end of an aisle or intersection). Here, the process also includes defining the start action and end action of the pattern based upon an operator interacting with at least one control of the industrial vehicle to operate the industrial vehicle according to the environmental procedure, and defining the rule as a function of the environmental procedure.

To more clearly illustrate the above, a specific non-limiting example is an interaction profile to teach an operator action defined by an industrial vehicle remote control operation.

An example definition of the operational feature is the use of a "GO" button on the industrial vehicle control.

An example pattern is defined by detecting that: the operator pressed the GO button, the industrial vehicle began to travel responsive to the operator pressing the GO button, and that the vehicle stopped after traveling some distance.

An example start action is thus detecting, e.g., by the controller 144 across the vehicle network bus 154, from a remote control module 156 that the operator pressed a GO button, e.g., on a wireless remote control that the operator possesses.

An example end action is correspondingly detecting, e.g., by the controller 144 across the vehicle network bus 154, from a traction control module 156 that the vehicle stopped after traveling responsive to the user pressing the GO button.

An example rule is "travel distance responsive to pressing the GO button on a remote control should be less than 9 meters".

A target response is "vehicle travel responsive to pressing the GO button that is less than 9 meters" is appropriate behavior, whereas vehicle travel 9 meters or greater is improper behavior. Reference is now drawn back to FIG. 4.

The above-example is presented by way of illustration, and not by way of limitation, as the industrial vehicle, industrial vehicle type, environment policy and operation procedures, combinations thereof, etc., can be used to establish the content of the interaction profile.

At 406, the process determines a cadence for the operator. For instance, the cadence can be related to the operator action of the interaction profile. In general, the cadence controls the timing/spacing for when a vehicle-initiated operator interaction occurs, e.g., for a training event, a positive reinforcement event, a negative reinforcement event, a reminder event, etc. Example cadences are described herein with reference to FIG. 5 and FIG. 6. However, the cadence describes the interval when the next cadence based vehicle-initiated operator interaction occurs. This interaction can be time based, event based, based upon a predicted decay in operator knowledge retention, combination thereof, etc. As such, the vehicle-initiated operator interaction is not triggered solely by a simple occurrence of an event in isolation.

In this regard, the process at 406 can perform loading into the vehicle controller, a cadence, where the cadence defines an interval between interactions associated with the operator action of the interaction profile. As noted above, the interval of the cadence can be established based upon time, a predetermined number of encounters with an instance of an event defined by the pattern, or a combination thereof (e.g., based upon a predetermined number of encounters with an instance of an event defined by the pattern, and a predetermined amount of time).

In another embodiment, the process determines the cadence by detecting by a processor on the industrial vehicle, an identity of the operator, and by determining the cadence for the operator, based upon the interaction profile.

The process at 406 can also optionally perform a training/teaching operator interaction. For instance, the process may perform displaying, via the user interface of the industrial vehicle, information related to the operator action of the interaction profile. As will be described in greater detail herein, the displaying information can include displaying training information that teaches the operator how to properly perform the operator action so as to define a correct response and an incorrect response, teaching proper usage and/or behavior of the operator action, teaching what constitutes improper usage and/or behavior of the operator action, presenting questions or testing the knowledge of the operator with regard to the operator action, combinations thereof, etc.

The training can also test the operator's knowledge of the training information by displaying a question (e.g., multiple choice question) requiring an answer from the operator where the operator's answer determines whether the operator has knowledge of the correct response.

With the operator informed with knowledge of the operator action, the process then performs, in an ongoing manner, machine observation of the vehicle operator.

At 408, the process monitors electronically collected by the industrial vehicle, such as information that may be communicated across the vehicle network bus, e.g., vehicle network bus 154, as detected by the I/O monitor 148, etc., as described with reference to FIG. 2. The monitored data can be aggregated, selectively aggregated, etc., to log appropriate information. For instance, the aggregation of data may only keep data collected between, near, around, or otherwise associated with the pattern, e.g., proximate to the start action and/or end action, etc.

The process then performs a set of actions responsive to detecting first data within the monitored information corresponding to the start action, and second data within the monitored information corresponding to the end action.

Thus, at 410, the process identifies first data from the monitored information as satisfying the start action. Keeping with the above example, the process may detect, e.g., via data communicated across the vehicle network bus 154, that the vehicle operator pressed the GO button. Even though the start action is detected, the process continues to monitor information electronically collected by the industrial vehicle.

At 412, the process identifies second data from the monitored information as satisfying the end action. Keeping with the above example, the process detects that the vehicle has come to a rest after traveling responsive to the operator pressing the GO button. In some instances, the start action and the end action can be satisfied by the same action/event. Other instances, the start action and the end action may be defined by different and/or unique operating parameters.

At 416, the process applies select components of the monitored information against the rule to define a performance response (i.e., performance calculation). As an example, the select components of information can be derived by data monitored across the vehicle network bus (or otherwise electronically collected) that is collected between the start action and end action, immediately before the start action or end action, responsive to the start action, immediately after the start action or end action, responsive to the end action combinations thereof, etc.

Keeping with the present example, with reference back to FIG. 2, the monitored data informs the controller 144 that the GO button was pressed by reading data from a remote control module 156 communicating data across the vehicle network bus 154. The controller 144 then determines that the vehicle began traveling, then came to a rest. For instance, the controller 144 can read odometry, encoder data, control information, etc., from a traction control module 156 across the vehicle network bus 154. As another example, the controller 144 can detect a change in position by reading data from environmental based location tracking 160 across the vehicle network bus 154, etc. Regardless, assume for this example, that the controller 144 determines that the vehicle traveled 6 meters. The controller 144 applies the rule ("travel distance responsive to pressing the GO button on a remote control should be less than 9 meters"). The performance calculation can be Boolean, e.g., the rule evaluated TRUE/FALSE. As another example, the performance calculation can be a value, e.g., Travel 6 meters, or some other suitable format. Reference is now drawn back to FIG. 4.

At 416, the process then compares the performance response to the target response. Keeping still with the above example, the process compares the performance calculation, e.g., 6 meters, to the target response, e.g., less than 9 meters.

At 418, the process generates performance feedback based upon the comparison of the performance response to the target response. By way of example the performance feedback can be defined as the vehicle operator encountering or otherwise initiating the operational feature in the interaction profile, and the result is a correct behavior. For some instances of the detected behavior, the process at 418 may also generate operator feedback to the display 136, e.g., in this case, an "approving (green) message" so that at a glance, the operator knows that the correct behavior was not only implemented, but acknowledged by the system. The performance feedback at 418 in some instances, can also trigger a modification of at least one performance parameter of the industrial vehicle, of a device in the vicinity of the operator, or a combination thereof, as described more fully herein.

At 418, the process can also log the encounter with the instance of the event, such as by saving the performance feedback in a profile history. The profile history is information stored in memory, e.g., in the industrial vehicle memory, on the remote server (e.g., in the PSI data 122 (FIG. 1), combinations thereof, etc.

At 420, the process detects, based upon the cadence, whether an observation event is due. If no observation event is due, the process loops back to 408 so that monitoring can continue.

In some embodiments, the process outputs to the display, regardless of whether an observation event is due (e.g., the cadence interval has not triggered), a negative performance feedback message indicating that the performance response was unsatisfactory in view of the target response. Thus, the operator can be informed if the operator response was not satisfactory according to the interaction profile.

For instance, if the vehicle operator has already learned an operational feature, and is demonstrating the correct behavior, the process does not want to keep re-teaching the operational feature. However, at some spacing determined by the cadence, e.g., once every 40 hours, etc., a reminder message can be presented, a training question can be asked, or some combination of user interaction can be initiated. For instance, the cadence may be time based, and thus independent of actual occurrences of an event. Thus at the cadence time, the system may ask the operator a question about usage of the vehicle, an operating policy, a polling question, etc. If the answer is wrong, the system can treat the incorrect answer similar to detecting an incorrect behavior. Correspondingly, if the answer is correct, the system can treat the correct answer similar to detecting a correct behavior. In this regard, the system can simply correct the incorrect answer by providing training. The system can in some instances, demonstrate the training topic, e.g., by video, by remotely controlling the industrial vehicle 108, or otherwise. The system can also modify the industrial vehicle and/or the environment in which the vehicle is operating responsive to an incorrect (or correct) operator interaction, as set out in greater detail herein.

Moreover, the process may periodically provide positive reinforcements or negative reinforcements based upon the behavior response. Most of the time, the performance feedback can be suppressed. However, there are times where reinforcement (positive or negative) is appropriate. Thus, an observation event can be based upon a cadence such as a temporal spacing, e.g., every 4 hours, a reminder is provided. The observation event can be based upon events, e.g., every nth time the behavior is observed, e.g., every 10 times, to provide performance feedback. The observation event can also be a combination of time and events, e.g., after four hours, on the next detected occurrence of the operational feature, or whichever occurs first, etc.

In some embodiments, detecting, based upon the cadence, that an observation event is due comprises adjusting the cadence. Adjustment to the cadence can be based upon a desired spacing, e.g., a desired temporal spacing, a desired event spacing, or combination thereof. For instance, in an example embodiment, the process can increase the cadence if the performance feedback in the profile history indicate a predetermined number of consecutive correct behaviors and decrease the cadence if the performance feedback in the profile history indicate an incorrect behavior.

Also, in some embodiments, e.g., where a temporal spacing is used, the process may set a minimum and a maximum value to the temporal spacing and may further increase the desired temporal spacing toward the maximum where the performance feedback results in a correct response, and decrease the desired temporal spacing toward the minimum where the performance feedback results in an incorrect response. For instance, the process can decrease the desired temporal spacing toward the minimum by a first amount where the performance feedback results in an incorrect response and a number of correct operator responses is below a threshold and decrease the desired temporal spacing toward the minimum by a second amount less than the first amount where the performance feedback results in an incorrect response and a number of correct operator responses is above the threshold.

At 422, the process outputs the performance feedback when the observation event is due, otherwise the performance feedback is suppressed. After providing feedback, the process flows back to 408 to continue as set out more fully herein. In some cases, e.g., where the cadence is altered (e.g., made longer or shorter), the process flow my loop back to 406. By way of example, the process can output to the display, if an observation event is due, a positive performance feedback message indicating that the performance response was satisfactory in view of the target response, a training message that reinforces the training information, or combination thereof.

In some embodiments, the process can further comprise presenting an instruction, e.g., by the controller 144 via the display 136, on the operational feature. The instruction can require operator feedback, e.g., by presenting an instruction on the operational feature as a question, a multiple-choice question, etc. This instruction can be part of an associated interaction profile and can provide content for training the operator on the proper functioning of the operational feature.

As noted more fully herein, the system can also modify performance of the industrial vehicle 108, electronic devices in the working environment of the operator, combinations thereof, etc. For instance, the process can modify at least one operational parameter of the industrial vehicle to tune the industrial vehicle performance to the skill of the operator The process 400 provides at least two different opportunities to make such interaction. For instance, at 418, the system can merely log the response to the event. Alternatively, based upon a proper response, the system can modify a vehicle parameter, e.g., maximum speed, maximum lift weight, maximum lift height, blending function, etc. A new capability can be added or an existing feature can be modified. This can be done my modifying control module set points or other operating parameters, such as by the controller 144 communicating the command across the vehicle network bus 154. The system can also affect other electronic devices in the work area of the operator. For instance, demonstrating an improper behavior, the system can send a push notification to nearby vehicles that the operator is in the vicinity and is not demonstrating the appropriate behavior. The proximity can be determined for instance, based upon location tracking, e.g., using the environmental based location tracking 160, knowledge of access point 110 last accessed, or other location determining means. In addition to push notifications, the system can also modify operation of nearby vehicles, e.g., to modify the range of travel enabled by a remote control (e.g., GO button), set minimum passing distance range, set maximum lift height, maximum travel speed, etc. This ensures that as the operator trains, the industrial vehicle and other industrial vehicles in the vicinity of the operator "tune" to the operator's skill.

The system can also modify performance of the industrial vehicle 108, electronic devices in the working environment of the operator, combinations thereof, etc., at 422 in a manner analogous to that of 418, e.g., by modifying at least one operational characteristic of the industrial vehicle based upon the profile history at a time established by the cadence. Moreover, the system can modify performance of the industrial vehicle 108, electronic devices in the working environment of the operator, combinations thereof, etc., at 418 and/or 422. For instance, in a practical application, positive modifications, e.g., unlocking a new capability, increasing a current capability (e.g., travel speed, lift height, lift weight, blending, etc.), is correlated to the cadence interval at 420. However, negative modifications, e.g., locking a capability, decreasing a current capability (e.g., travel speed, lift height, lift weight, blending, etc.), modifying an operating environment can be carried out at either 418 (e.g., to carry out immediate actions) or at 422 to correlate the negative modifications resulting from wrong behavior to the cadence at 420.

Cadence

As noted above, the cadence, including the spacing between messages can be temporal, event driven, or a combination thereof. Moreover, messages can be generic, vehicle specific, environment specific, the messages can be uniquely tailored to a specific vehicle operator, or a combination thereof. This can be accomplished because an operator is required to log onto the industrial vehicle before the industrial vehicle is enabled for normal operation.

An algorithm that sets the cadence can be application specific. As a few illustrative examples, logic can change the spacing of the messages based on correct or incorrect answers and/or behavior performance. In an example implementation, correctly answered topics trigger a longer spacing, and when answered correctly again, trigger an even longer spacing and so on. In practical applications, there is a minimum and maximum time for the spacing so that the question will not come too often or too rarely. If a question is answered incorrectly and/or if an incorrect behavior is observed, the system can resort back to the original, short spacing so that a missed topic can be learned intensively.

In some embodiments, this dynamic spacing is uniquely driven per topic, mapped to each operator. Thus, an operator training on multiple topics may have several different cadences, a specific cadence tied to each topic.

Moreover, the cadence can be linked to a distribution, as discussed herein in the Absolute Control section. This allows operators performing at a high level to quickly move through low levels (e.g., trainee, beginner, etc., to intermediate), but make it progressively harder to transition to advanced or expert. In other embodiments, the system may allow all operators to reach the same status, e.g., all operators can become expert in one or more technology features, environment procedures, etc.

Yet further, in some embodiments, successful interaction, i.e., a correct answer, a demonstrated correct behavior, combinations thereof, etc., can be rewarded by the vehicle automatically enabling improved vehicle performance, e.g., higher travel speed, heavier load weight, the ability to blend, etc. Likewise, in some embodiments, the system can be punitive based upon incorrect operator answers and/or behaviors, e.g., downgrading vehicle performance, lowering performance capabilities, etc. For instance, the processor of the controller 144 can communicate across the vehicle network bus 154 to program set points in a controller, e.g., to set maximum travel speed, maximum acceleration, lift/lower, and other vehicle capabilities.

In some embodiments, there are multiple cadences, e.g., a unique cadence per operator, per topic to set an interval for reinforcement, as well as a unique cadence that controls the rate at which new topics are introduced. Each time a cadence is triggered, the system has an opportunity to modify an internal operating state of the vehicle, e.g., to dynamically adjust to the vehicle operator, based upon the operator's interaction with the graphical user interface, based upon recorded operator performance on the vehicle, based upon environmental data, combinations thereof, etc. Here, each cadence, corresponding to each interaction profile topic, need not modify the same industrial vehicle operating state. For instance, an interaction profile instance directed to proper stopping may affect maximum travel speed, whereas as interaction profile instance directed to load handling may affect blending capability, etc.

Example Cadence 1

In a first example described with reference to FIG. 5, the cadence provides a default spacing for all operators. In this example, a process 500 assumes that the operator has already successfully logged onto the industrial vehicle (analogous to 402, FIG. 4), and that the controller 144 has loaded a corresponding interaction profile (analogous to 404, FIG. 4).

The system introduces a new topic, e.g., by interacting with the processor on the industrial vehicle outputting content to the operator interface 162 to provide training, instruction, presenting a test question requiring an answer, etc. Once the operator satisfies the training, the operator must demonstrate the correct behavior for a predetermined consecutive number of times, e.g., 4 times. Correct behavior can be determined as set out in FIG. 4 (see for instance, 408-418, FIG. 4). After satisfying the initial consecutive number of correct behaviors, the operator interaction occurs at a fixed interval. The interval can be event/encounter-based (e.g., every 10 event encounters), time-based (e.g., every 80 hours), or a combination thereof (e.g., the sooner of 10 event encounters or 80 hours). An incorrect behavior resets the system back to the initial training, and the process starts over.

By way of example, the system can be broken down into three steps. The first step is introducing reinforcement messaging to the operator. In an example implementation, the system introduces one new behavior per operator, per truck type, every 40 hours of operation. To begin, the operator receives their first prompt message for a new behavior, and thereafter, the operator is required to receive four green messages in a row, corresponding to four correct behaviors in a row. Upon initial training, the second step is calculating the operator's reinforcement spacing. As an example, after introduction, a green message/tone appears for every 10th correct behavior. A red message appears for an incorrect behavior and the user is reset back to the first step. As an optional third step, the system can customize the cadence based upon the operator, e.g., based upon accumulated data. Here, the system can update the cadence interval, number of correct behaviors for a positive reinforcement, adjust the number of negative reinforcements before resorting back to the first step, etc. In some embodiments, the system continues to monitor operator proficiency over time and updates reinforcement spacing accordingly in real time.

Figure 5:
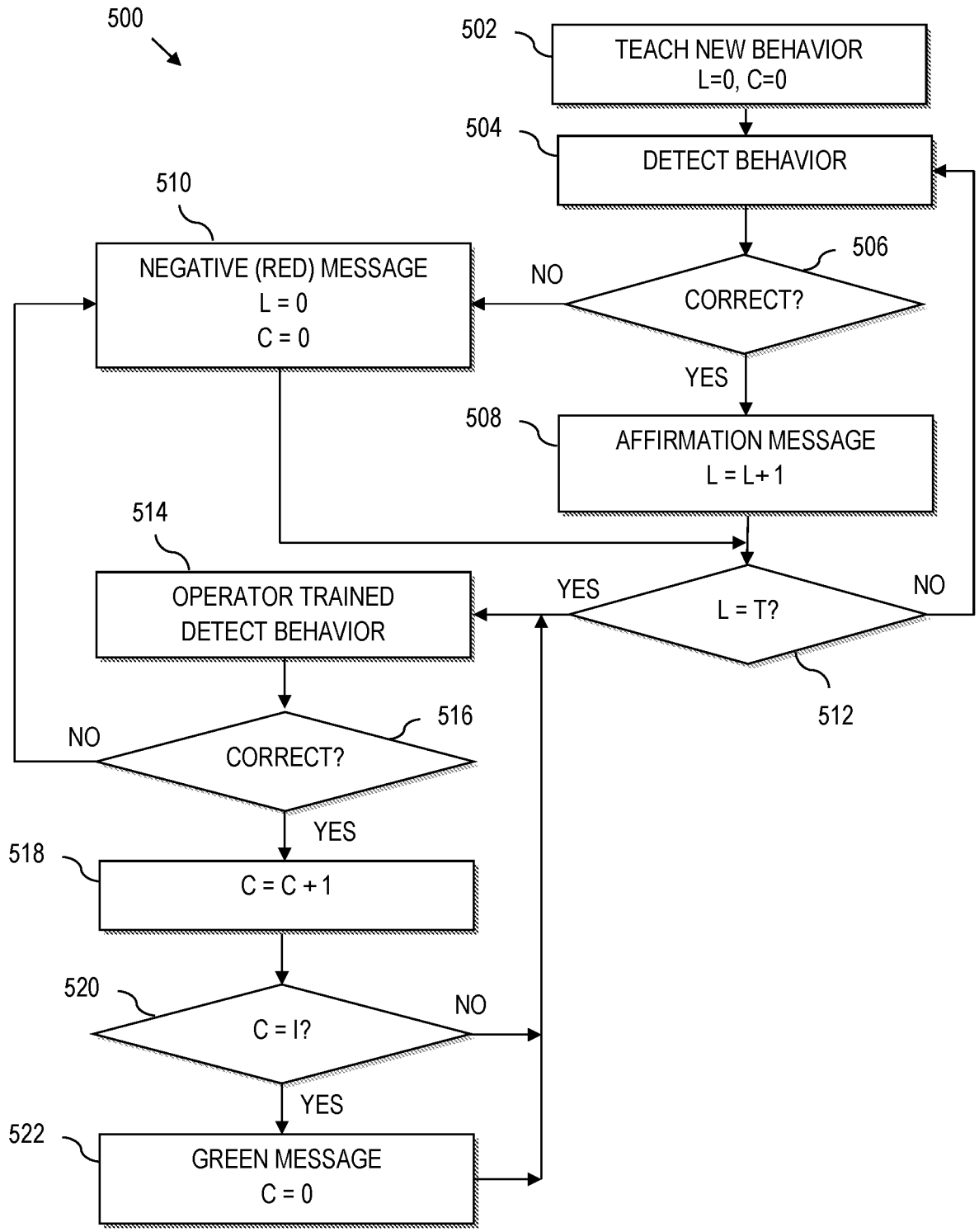
FIG. 5 is a flowchart illustrating an example approach for establishing a cadence useful with the framework of FIG. 4, according to aspects of the present disclosure.

Referring specifically to FIG. 5, a flowchart illustrates an implementation of the first example cadence by a process 500 for vehicle-initiated cadenced operator interaction. In this regard, the process 500 may be implemented on computer-readable hardware that stores machine-executable program code, where the program code instructs a processor to implement the described process. The process 500 may also be executed by a processor coupled to memory, where the processor is programmed by program code stored in the memory, to perform the described process. For instance, the process 500 can be implemented by the controller 144 (FIG. 2).

In the flowchart of FIG. 5:
L=Learning Mode Correct Consecutive Behaviors
T=Variable Set to Number of Consecutive Correct Behaviors to be Considered Trained, e.g., T=4
C=Count of Correct Behaviors After Trained
I=Variable Set to Number of Consecutive Correct Behaviors Before Next Green Message, e.g., I=10
Once data is collected, the system can tune T and I for personalized interactions.

At 502, the process teaches the operator a new behavior (e.g., using any of the techniques described more fully herein). Moreover, the process sets a number of consecutive behaviors (L) to zero. Further, the process sets a count of number of times the operator performed the correct behavior (C) to zero.

By way of example, assume a simple case where only one topic is to be addressed. Referring briefly back to FIG. 4, at 404, the processor of the controller 144 is loaded with an interaction profile. The interaction may be associated with a training topic and can include the code necessary for the controller 144 to communicate to the vehicle operator, via the display 136, the training topic corresponding to the new behavior.

By way of illustration, and not by way of limitation, a plain English representation of an example topic may be "Use a vehicle remote control "GO" button to automatically control the industrial vehicle 108 to advance less than 9 meters". However, the vehicle operational action data underlying the topic can comprise code that implements an operator interaction on the display 136 (e.g., by presenting a teaching statement, asking a question, asking a multiple-choice question, etc.). The vehicle operational action data may also be used to express a first rule on how to interpret the operator response, e.g., interpret an answer entered via data read from a suitable input/output device on the vehicle, and a second rule to determine the measure of performance, as described above.

Moreover, code may be necessary to convert generic rules to rules that can be interpreted by the vehicle controller. For instance, a rule can be "TD=Truck Travel Distance Start to Stop". Behavior is correct IF TD<9 meters, Operator not on vehicle, and GO button pressed to initiate movement"; Behavior is incorrect IF (TD>=9 meters AND GO button pressed) OR (TD<9 meters and operator on truck) OR (TD<9 meters and traction control manually engaged).

At 504, the process detects a behavior from the operator. For example, the operator may perform an action that is registered by the programmed pattern, which is detected by the controller 144. See for instance, any combination of 408-416, FIG. 4 and other examples throughout.

As noted above, rules are interpreted based upon actual vehicle data. As an example, the processes herein can map the pattern to actual vehicle network bus data (as described with reference to FIG. 2) thus providing vehicle-specific intelligence. Keeping with the above example, a rule may require detecting that a GO button on a remote control is pressed. On a first vehicle, the system may interpret this requirement by issuing a query to a remote control module across the vehicle network bus 154 to look for a first specific value. Moreover, the rule may require that the operator is off the vehicle when the GO button is pressed. As such, the process can issue a query to operator presence sensors in the operator compartment platform looking, where the query is looking for a value indicative of no operator being present. A second industrial vehicle of a different type may detect that a GO button is pressed by directly recognizing a wireless signal (e.g., Bluetooth signal) from a wireless remote. The operator can be judged to be off the vehicle based upon a strength of the received wireless signal. In some embodiments, some vehicles may be unable to interpret every requirement and/or condition in a rule. Here, the process can omit a component of a rule, modify the rule to fit available data, etc. Reference is now drawn back to FIG. 5.

At 506, the process determines whether the detected behavior is a correct behavior or not. If the detected behavior is the correct behavior, then the process 500 proceeds to 508. Otherwise, the process 500 proceeds to 510. The process determines whether the behavior is correct by using techniques, examples of which are set out in greater detail herein.

At 508, the process provides a positive reinforcement message (e.g., words, symbol, etc.) that is displayed to the operator to let the operator know that the correct behavior has been received, and the number of consecutive behaviors (L) is incremented by one. In an example embodiment of FIG. 5, the positive reinforcement message is displayed in a green format (e.g., green font, green background, green symbol, or combinations thereof). See also, 428 and/or 422, FIG. 4. In other embodiments, the positive reinforcement can be a tone, chime, light flash, message, or other output.

At 510, the process provides a negative reinforcement message (e.g., words, symbol, etc.) to let the operator know that an incorrect behavior has been received. See also, 418 and/or 422, FIG. 4. Here, the process also resets the number of consecutive behaviors (L) to zero. Further, the count of number of times the operator performed the correct behavior (C) is also reset to zero (as it may have been incremented through other passes through the process, as discussed below). In an example embodiment of FIG. 5, the negative reinforcement message can be displayed in a red format (e.g., red font, red background, red symbol, or combinations thereof). The process then proceeds to 512.

Regardless of how the process enters 512, if the number of consecutive behaviors (L) is not equal to a number of consecutive correct behaviors required for training (T), then the process 500 loops back to 504 to wait for another instance of the topic behavior. However, if the number of consecutive behaviors (L) is equal to the number of consecutive correct behaviors required for training (T), then the process exits a training mode (i.e., 502 through 512) and enters a proficiency mode by proceeding to 514.

At 514, the process is in proficiency mode and the operator is considered trained. Thus, positive reinforcement messages will be displayed less frequently.

At 514, the process detects a further behavior of the operator, similar to 504.

At 516, the process determines whether the detected behavior is a correct behavior or not. If the received behavior is the correct behavior, then the process 500 proceeds to 518. Otherwise, the process 500 proceeds to 510.

Again, at 510, a negative reinforcement message (e.g., words, symbol, etc.) can be displayed to the operator to let the operator know that an incorrect behavior has been received, and the number of consecutive behaviors (L) is reset to zero. Further, the count of correct number of times the operator performed the correct behavior (C) is also reset to zero (as it may have been incremented through other passes through the process, as discussed below). In the embodiment of FIG. 5, the negative reinforcement message can be displayed in a red format (e.g., red font, red background, red symbol, or combinations thereof). The process 516 then re-enters training mode and proceeds to 512.

However, at 518 (because a correct behavior was received), the process increments the count of the correct number of times the operator performed the correct behavior in proficiency mode (C) by one. However, no positive reinforcement message is displayed.

At 520, the process makes a determination whether the number of consecutive correct behaviors has reached a threshold (I). If the number of consecutive correct behaviors is less than the threshold, the process loops back to 514 and awaits a behavior to receive. On the other hand, if the number of consecutive correct behaviors equals the threshold, then the process proceeds to 522.

At 522, the process displays a positive reinforcement message (e.g., words, symbol, etc.) to the operator to let the operator know that the correct behavior has been received. See also, 422, FIG. 4. The process also sets the number of consecutive count of behaviors in proficiency mode (C) to zero. Keeping with the above example, the positive reinforcement message can be displayed in a green format (e.g., green font, green background, green symbol, or combinations thereof). The process 500 loops back to 514 to await another behavior.

Therefore, while in training mode, the operator receives positive reinforcement for each correct behavior. However, when in proficiency mode, the positive reinforcement is only shown once for consecutive correct behaviors equal to the threshold.

The process 500 of FIG. 5 may be for one or more new behaviors. For example, there may be one process training the operator to use a remote feature and another process for training the operator to sound a horn at an intersection. A failure on one of the processes will not affect the state of the other process. As a different example, the same process may be used for training both behaviors, where an incorrect behavior for either training will affect the other.

As another example, if the new behavior is to sound a horn at an intersection, then the industrial vehicle (or a remote server in communication with the industrial vehicle) may know when the industrial vehicle approaches an intersection due to a location tracking system on the vehicle or otherwise in the facility. If the user sounds the horn at the intersection, then that behavior is received. However, a lack of implementing a behavior may also be received. Thus, in an example where the operator does not sound the horn, even though there was no action by the operator, the fact that the operator did nothing is the behavior that is received because the system detected that the vehicle was at an intersection.

Modification to the industrial vehicle 108 can be carried out (e.g., as described at 418 and/or 422) at several points during the implementation of the process 500. For instance, industrial vehicle modification can be carried out at 502, a "YES" transition from 512 to 514, a negative message at 510, every instance of 522, every nth instance of 522, combinations thereof, etc.

Example Cadence 2

Figure 6:
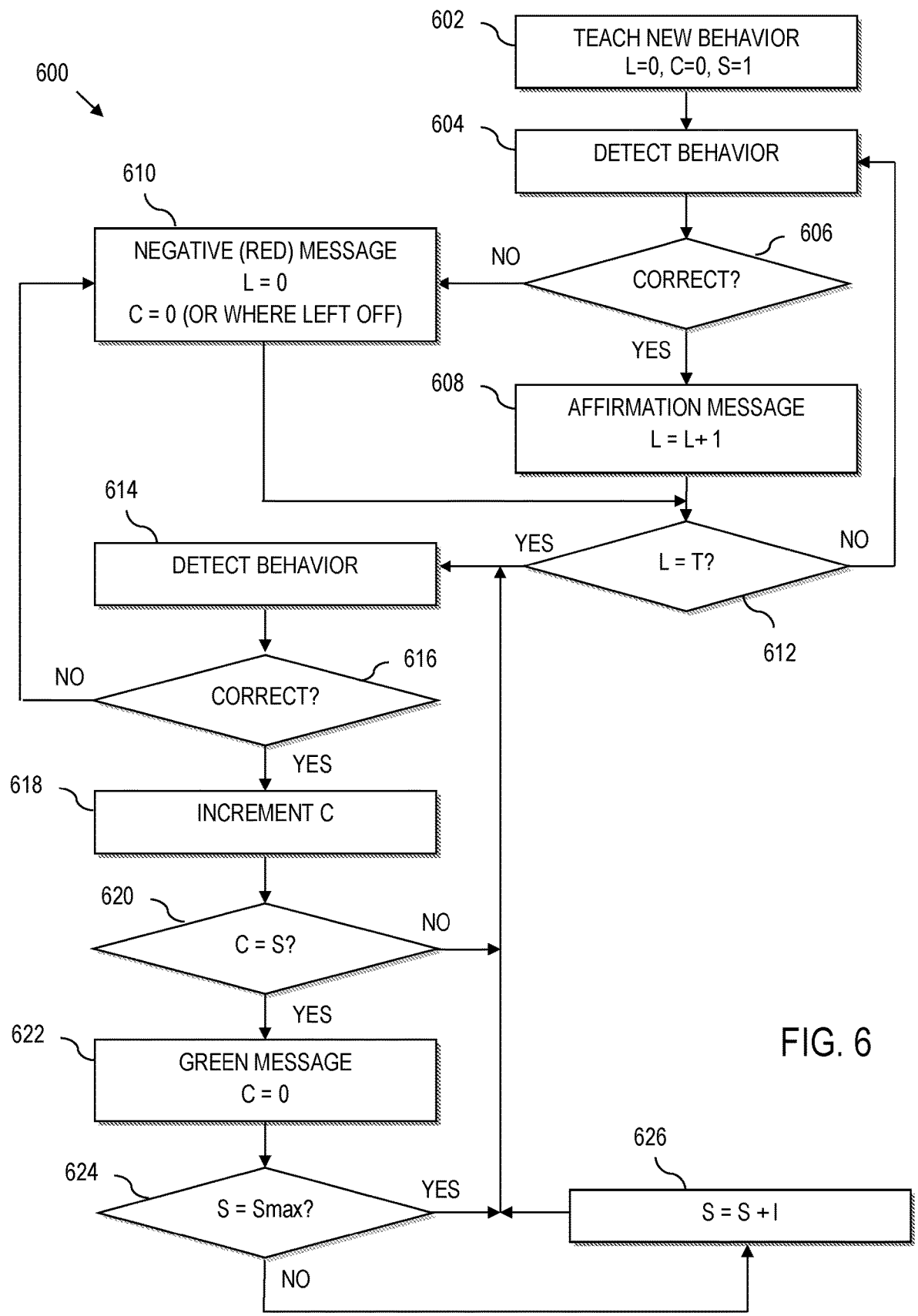
FIG. 6 is a flowchart illustrating another example approach for establishing a cadence useful with the framework of FIG. 4, according to aspects of the present disclosure.

As another example, a cadence can be personalized, based upon operator and/or topic, as illustrated in FIG. 6. In this regard, a process 600 can replace the process 500 of FIG. 5. As with FIG. 5, the process assumes that the operator has already successfully logged onto the industrial vehicle (analogous to 402, FIG. 4), and that the controller 144 has loaded a corresponding interaction profile (analogous to 404, FIG. 4).

As an example, personalization can be carried out based upon a ratio of correct vs. incorrect behavior events. As another example, personalization can be carried out based upon total behavior events to achieve a proficiency target.

A first subprocess is to introduce reinforcement messaging to the operator. In an example, the system introduces one new behavior at a time per operator, per truck type. To begin, the operator receives a first training, e.g., a first prompt message for a new behavior. The prompt message is followed by 3 green messages in a row for 3 correct behaviors in a row. The operator must reach a predetermined proficiency target before the introduction of the next new behavior. This first subprocess is analogous to that of FIG. 4. In this example, a cadence is defined by a spacing between positive reinforcements that increases each time a proper behavior is observed. As an example, after each sequential correct behavior, or group of correct sequential behaviors, a positive message spacing (spacing rate) increases, e.g., by one (1) up to a maximum (e.g., 10 spaces) between positive messages, based upon a graduated increment, e.g., 3, 6, 9, according to some other scale, e.g., non-linear, etc. If an incorrect behavior is detected, then a training mode is set/reset, requiring the operator to demonstrate a predetermined number of correct sequential behaviors, e.g., 3, before resuming the cadence of increased spacing. Here, the spacing rate can reset to a previous state, e.g., to the beginning of the training process, e.g., one (1) space. Alternatively, after retraining, the operator may pick up on the count spacing where the operator left off. Thus, if the operator was at 5 spaces at the time of an incorrect behavior, upon completing the required sequential behaviors (e.g., 3 in this case), the user would return to a spacing of 5.

Determining or otherwise calculating the operator's initial learning proficiency can be carried out in a number of ways. As an example, an initial learning proficiency can be determined by a ratio of correct vs. incorrect behavior events. As an illustration, an x-hour (e.g., 40-hour) rolling average ratio of correct behaviors vs. incorrect behaviors defines a point on a bell curve distribution that sets when a new task can be added for a specific operator.

As another example, learning proficiency can be set based upon total behavior events to achieve proficiency target. As an example, the system can count the total correct behavior events+incorrect behavior events needed for the operator to reach the predetermined proficiency target (e.g., the ratio of 90% correct vs. incorrect behaviors, where the number of behavior events needed to achieve 90% proficiency defines a point on a bell curve distribution).

The system can also personalize reinforcement spacing between green messages/tones. As an example, the distribution point on a curve (e.g., a bell curve) controls green message spacing and takes over from the initial spacing. The distribution point on the curve also controls the rate of increasing temporal spacing as the habit forms. The system calculates a bell curve distribution that may require aggregated proficiency data from many operators. However, the bell curve becomes more precise over time as the number of operators and aggregated data grows. Optionally, accumulated data about an individual operator can eventually supersede the original calculation, providing high precision personalized spacing. The system continues to monitor operator proficiency over time and updates reinforcement spacing accordingly in real time.

Referring specifically to FIG. 6, a flowchart implementing a process 600 for learning reinforcement for an operator of an industrial vehicle, where there is a variable threshold for a number of times a reinforcement message is suppressed. In this regard, the process 600 is analogous to the process 500 of FIG. 5 unless otherwise noted.

In the process 600 of FIG. 6, the threshold for a number of times a reinforcement message is suppressed is constant. Moreover, as illustrated:

L=Learning Mode Correct Consecutive Behaviors
T=Variable Set to Number of Consecutive Correct Behaviors to be Considered Trained, e.g., T=3
C=Count of Correct Behaviors After Trained
I=Increment, e.g., I=1, 2, etc., Controls Each Sequential Interval
S=Spacing Between Positive Reinforcement Messages
Smax=Maximum Spacing Between Green Messages At 602, the process teaches the operator a new behavior. The process also sets a number of consecutive behaviors in training mode (L) to zero. Further, the process sets a count of the number of times the operator performed the correct behavior in proficiency mode (C) to zero. In this regard, the teaching of a new behavior is analogous to 502 (FIG. 5).

At 604, the process detects a behavior performed by the operator. Examples of detecting behavior are analogous 504 (FIG. 5), and to those described in greater detail herein.

At 606, the process determines whether the received behavior is a correct behavior or not. If the received behavior is the correct behavior, then the process 600 proceeds to 608. Otherwise, the process 600 proceeds to 610. The determination at 606 is analogous to 506 (FIG. 5) and can be carried out using any techniques described more fully herein.

At 608, the process provides a positive reinforcement message (e.g., words, symbol, etc.) is displayed to the operator to let the operator know that the correct behavior has been received. Moreover, the process increments the number of consecutive behaviors (L) by one. In the embodiment of FIG. 6, the positive reinforcement message is displayed in a green format (e.g., green font, green background, green symbol, or combinations thereof). In this regard the message at 608 is analogous to 508 (FIG. 5)

At 610, the process displays a negative reinforcement message (e.g., words, symbol, etc.) to the operator to let the operator know that an incorrect behavior has been received, e.g., analogous to 510 (FIG. 5). Here, the process further sets/resets the number of consecutive behaviors (L) to zero. Further, the process sets the count of the correct number of times the operator performed the correct behavior (C) to some number, e.g., zero, a previous state, etc., as described more fully herein. In the embodiment of FIG. 6, the negative reinforcement message is displayed in a red format (e.g., red font, red background, red symbol, or combinations thereof).

The process then proceeds to 612, which is analogous to 512 (FIG. 5). Regardless of how the process enters 612, if the number of consecutive behaviors (L) is not equal to a number of consecutive correct behaviors required for training (T), then the process 600 loops back to 604 to receive another behavior. However, if the number of consecutive behaviors (L) is equal to the number of consecutive correct behaviors required for training (T), then the process exits a training mode (i.e., 602 through 612) and enters the proficiency mode by proceeding to 614. In some embodiments, the spacing S can be adjusted, e.g., set to S=max (1, S-I), or some other desired value.

At 614, the process is in proficiency mode and the operator is considered trained. Thus, positive reinforcement messages will be displayed less frequently as not to annoy, frustrate, distract, or otherwise create noise for the operator. At 614, a further behavior of the operator is detected, analogous to 604, and to 514 (FIG. 5).

At 616, the process determines whether the received behavior is a correct behavior or not. If the received behavior is the correct behavior, then the process 600 proceeds to 618. Otherwise, the process 600 proceeds to 610. In this regard, the process at 616 is analogous to 515 (FIG. 5).

At 618 (because a correct behavior was received), the process increments the count of the correct number of times the operator performed the correct behavior in proficiency mode (C). However, no positive reinforcement message is displayed. In some embodiments the increment is by 1, in which case, 618 is analogous to 518 (FIG. 5). In other example embodiments, the increment can be based upon some graduated, increasing, decreasing, non-linear, or other increment. Examples are to implement by 3 up to a maximum of 21; to increment by 2, then 3, then 4, etc.

At 620, the process determines whether the number of consecutive correct behaviors has reached a variable set to represent the spacing between positive reinforcement messages (S). If the number of consecutive correct behaviors is less than the variable (S), the process loops back to 614 and awaits an encounter with another instance of the behavior. On the other hand, if the number of consecutive correct behaviors equals the variable (S), then the process proceeds to 622.

At 622, the process provides a positive reinforcement message (e.g., words, symbol, etc.) to the operator to let the operator know that the correct behavior has been received, and the number of consecutive correct behaviors in proficiency mode (C) is reset to zero. In this regard, 622 is analogous to 522 (FIG. 5). In the embodiment of FIG. 6, the positive reinforcement message is displayed in a green format (e.g., green font, green background, green symbol, or combinations thereof).

At 624, the process determines whether the variable (S) is equal to a maximum spacing between green messages (Smax). If not, then the process 600 increments the variable (S) by an increment value (e.g., any positive, whole number) at 626 and proceeds to 614 to receive another behavior. Otherwise, the process 600 skips 626 and loops back to 614 to wait for the next encounter with an instance of the event.

Therefore, while in training mode, the operator receives positive reinforcement for each correct behavior. However, when in proficiency mode, the positive reinforcement is only shown once for consecutive correct behaviors equal to the variable (S).

The process 600 of FIG. 6 may be for one or more new behaviors. For example, there may be one process running for training the operator to sound a horn at an intersection and another process for training the operator to perform a blending function. A failure on one of the processes will not affect the state of the other process. As a different example, the same process may be used for training both behaviors, where an incorrect behavior for either training will affect the other.

The process 600 can be expanded. For instance, each time Smax is reached (or each nth time Smax is reached where n is any integer), the system can spawn another instance of the process for a new feature, proficiency, behavior, etc., which can start at 602 while the current behavior continues in its own loop.

Example Process for Providing Performance Feedback

Figure 7:
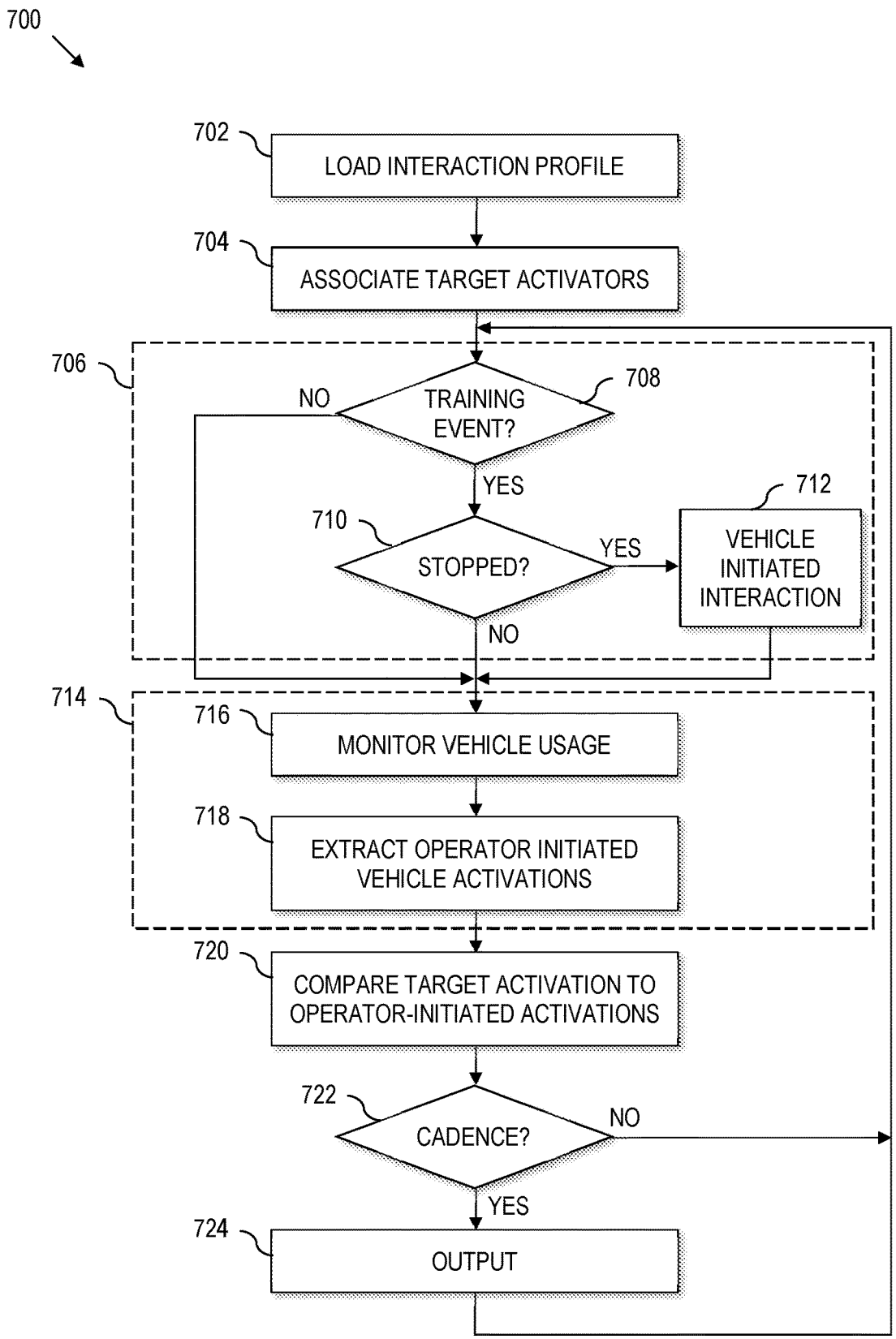
FIG. 7 is a flowchart illustrating an implementation of the general framework for a vehicle-initiated cadenced operator interaction system from a vehicle perspective, according to aspects herein.

With reference to FIG. 7, a computer-implemented process 700 is illustrated, for providing performance feedback of an industrial vehicle. The industrial vehicle has hardware including a user interface communicatively coupled to a vehicle controller, as noted more fully herein. The illustrated process can be carried out using any combination of components as described herein. In this regard, the process 700 of FIG. 7 overlaps with, and illustrates an example of carrying out features of FIG. 4. Notably, the process 700 assumes that an operator has already logged in, analogous to 402 (FIG. 4).

At 702, the process loads into the vehicle controller, an interaction profile. Here, the interaction profile corresponds to a training topic, and comprises a rule associated with a vehicle operational capability. The process at 702 is analogous to 404 (FIG. 4).

At 704, the process associates target vehicle activations with the rule, where the target vehicle activations enable the vehicle controller to apply the rule. Here, the target activators at 704 can be used to define the start action 410 (FIG. 4) and end action 412 (FIG. 4).

At 706, the process determines whether a training event is due, e.g., based upon the cadence (see 406, FIG. 4).

As an example, the process 706 can comprise determining, at 708, whether a training event is due, e.g., based upon a predetermined cadence and a training status. As an example, a decision is made whether the operator is in a training mode or proficiency mode as noted above. Moreover, due to the cadence, a message opportunity may be suppressed because of the cadence requirements.

Assuming that the cadence is triggered to a feedback state, the process may detect at 710 whether the industrial vehicle is stopped. If the industrial vehicle is not stopped, the process 700 can continue on (illustrated), or the process can loop back to wait for the industrial vehicle to stop. If the industrial vehicle is stopped, the process performs at 712, a first vehicle-initiated interaction by presenting via the user interface on the industrial vehicle, an instruction to the operator on how to implement the vehicle operational capability, an environmental procedure, etc., corresponding to the training topic as described more fully herein.

At 714, the process performs a machine observation. By way of example, the process 700 can perform the machine observation by monitoring at 716, via the vehicle controller 144 on the industrial vehicle, vehicle usage information during normal operation of the industrial vehicle. Monitoring at 716 may be implemented for instance, analogous to monitoring 408 (FIG. 4). The process at 714 also comprises extracting at 718, operator-initiated vehicle activations from the monitored vehicle usage information. The extraction at 718 can be implemented, for instance, in a manner analogous to 410-416 (FIG. 4).

At 720, the process compares target vehicle activations to the monitored operator-initiated vehicle activations using the rule to derive a performance status indicative of the operator's implementation of the vehicle operational capability. The comparison at 720 can be implemented analogous to the comparison 416 (FIG. 4).

At 722, a decision is made whether to output feedback or to suppress the feedback based upon the cadence. If no feedback is to be given, the process loops back to 706 to continue monitoring and processing as set out more fully herein. In this regard, the decision at 722 can be implemented analogous to the decision 420 (FIG. 4).

At 724, the process 700 performs, e.g., for each machine observation, a second vehicle-initiated interaction. The second vehicle-initiated interaction can be carried out by outputting performance feedback indicative of the derived performance status to the graphical user interface based upon the predetermined cadence. The process 724 can be implemented analogous to the output 422 (FIG. 4).

The process then loops back, e.g., to 706 or 714 depending upon the implementation, to continue monitoring and processing as set out more fully herein.

The process 700 can optionally implement industrial vehicle control, modification, control or messaging of proximate devices in the vicinity of the operator/industrial vehicle, or a combination thereof, for instance, at 720 and/or 724, e.g., as set out more fully herein (see for instance, the explanation at 418 and/or 422 of FIG. 4).

Example Process for Providing Performance Feedback

Figure 8:
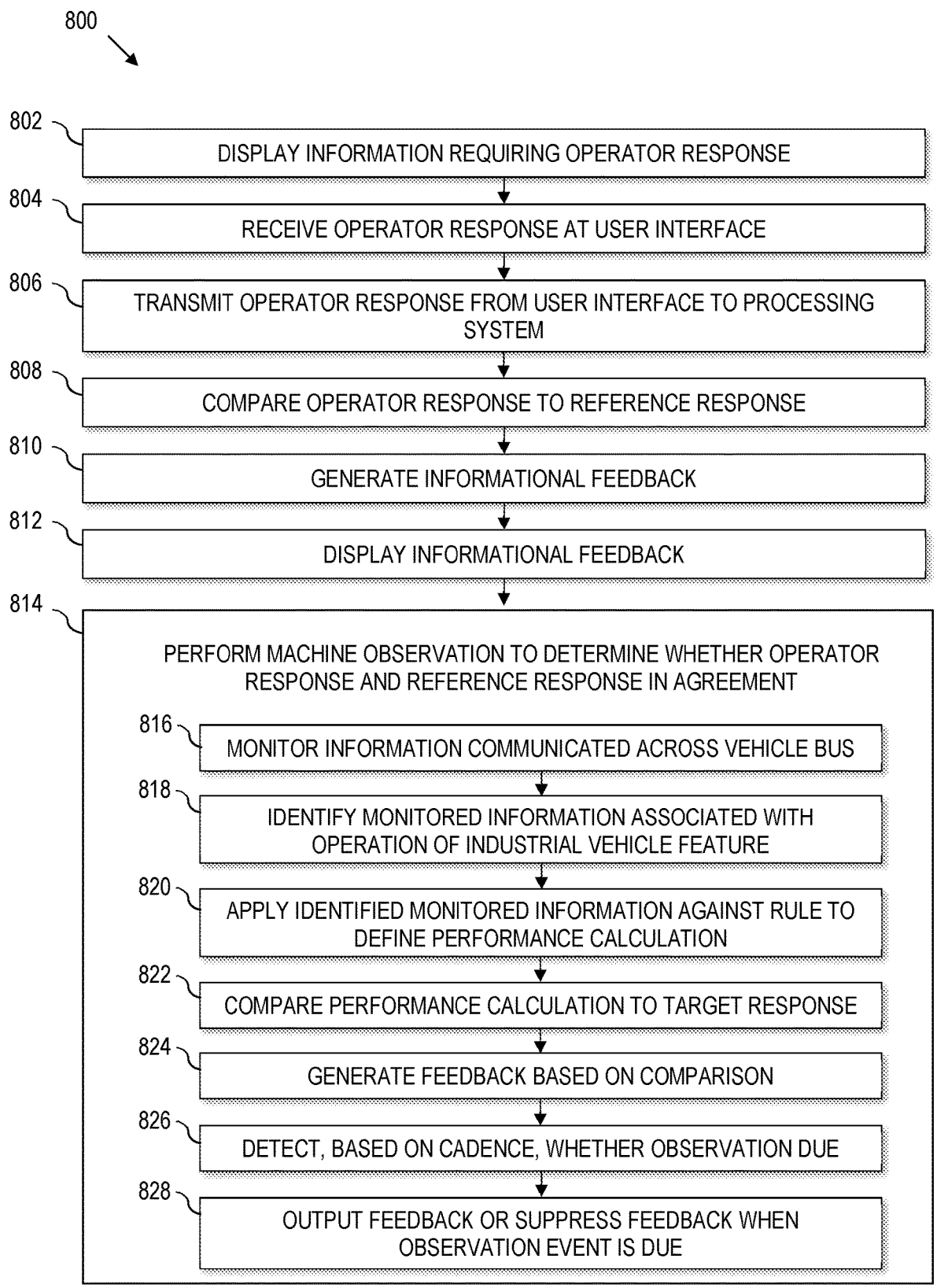
FIG. 8 is a flowchart illustrating an implementation of the general framework for a vehicle-initiated cadenced operator interaction system from a user interface perspective, according to aspects herein.

Whereas FIG. 7 illustrates aspects of the process of FIG. 4 from the perspective of the industrial vehicle, FIG. 8 illustrates aspects of the process of FIG. 4 from the perspective of the graphical user interface.

With reference to FIG. 8, a computer-implemented process 800 for providing performance feedback of an industrial vehicle is provided. The industrial vehicle has hardware including a user interface communicatively coupled to a vehicle controller, as noted more fully herein. The illustrated process can be carried out using any combination of components as described herein.

At 802, the process displays, based upon an operator-specific cadence, at a user interface of an industrial vehicle, information related to operation of an industrial vehicle, a technology feature, an operating environment procedure, etc. In some instances, the information can require an operator response. The process at 802 can be implemented for example, at 712 of FIG. 7, and can thus be carried out using any techniques described more fully herein.

At 804, the process receives the operator response at the user interface.

At 806, the process transmits the operator response from the user interface to a processing system.

At 808, the process compares, e.g., by the processing system, the operator response to a reference response.

At 810, the process generates, e.g., by the processing system, informational feedback based on comparing the operator response to the reference response.

At 812, the process transmits the informational feedback to the user interface for displaying, at the user interface, the informational feedback.

Depending upon the information required by the associated interaction profile, the operator may be required to interact with the industrial vehicle as part of the training, e.g., to demonstrate an ability to operate a technical feature of the industrial vehicle. Here, the extra user interaction is captured at 814.

At 814, the process performs a machine observation to determine whether the operator response and reference response are in agreement.

As a non-limiting example, a machine observation at 814 can be carried out by the process described at 816-828. For instance, the example machine observation can comprise monitoring at 816, information communicated across the vehicle network bus, and by identifying at 818, monitored information associated with the operation of the industrial vehicle technical feature. The machine observation at 814 can be further carried out in this example, by applying at 820, the identified monitored information against a rule to define a performance calculation, and comparing at 822, the performance calculation to a target response. The machine observation at 814 is still further carried out in this example, by generating at 824, performance feedback based upon the comparison, detecting at 826, based upon the cadence, whether an observation event is due, outputting at 828, performance feedback when the observation event is due, and suppressing the performance feedback is an observation event is not due.

In this regard, the process steps 816-828 can also be used to carry out 408-422 (FIG. 4) and/or 714-724 (FIG. 7) or vice versa.

Miscellaneous

As described more fully herein, and with reference to any of the preceding FIGURES, computing an operator-specific cadence can be based upon one or more factors, e.g., based on analyzing operator performance, detecting operator learning and/or forgetting patterns, etc. Generating performance feedback can comprise generating positive performance feedback based on an analysis of positive operator performance. Likewise, generating performance feedback can comprise generating negative performance feedback based on an analysis of negative operator performance. As noted more fully herein, generating a performance feedback can comprise providing a select one of an approving message, a disapproving message, and a reminder message. Further, generating the performance feedback can comprise providing the performance feedback after multiple repetitions of the same correct performance status. Generating performance feedback can comprise generating visual feedback, generating audible feedback corresponding to the visual feedback, transmitting the visual feedback from the controller to the user interface, transmitting the audible feedback from the controller to the user interface, and providing the audible feedback at the user interface substantially concurrently with displaying the visual feedback.

As another example, processes herein can provide an operator-facing performance tracker dashboard that is displayed on the graphical user interface. The operator-facing performance tracker dashboard can display metrics defining the frequency of operator usage of each vehicle operational action presented to the operator via the graphical user interface. The operator-facing performance tracker dashboard can also display compliance indicia with each corresponding displayed vehicle operational action. The processes herein can also provide a trainer facing dashboard, which identifies whether the frequency of operator usage of each vehicle operational action presented to the operator via the graphical user interface meets a first predetermined threshold and whether compliance with each corresponding vehicle operational action exceeds a second predetermined threshold.

In some embodiments, the controller is located on the industrial vehicle. In other embodiments, the controller is located remotely from the industrial vehicle, e.g., is implemented on a remote server. In some example embodiments, duties can be split between a controller on the industrial vehicle and a controller on a remote server. For instance, the controller on the industrial vehicle can transmit the operator response to questions, an extrapolated operator performance, etc., to a server located remotely from the industrial vehicle. Likewise, the controller on the remote server can process industrial vehicle data against rules and identify behaviors using techniques as described more fully herein. The processor on the remote server can then notify the industrial vehicle in real time to present feedback to the operator on the display of the industrial vehicle.

As another example, the remote server can collect the operator response to a question. The remote server can also collect the extrapolated operator performance data corresponding to one or more detected instances of the associated operator behavior. The remote server generates aggregated personalized data for the operator, which is formatted for display on a graphical user interface, e.g., any interface described with reference to FIG. 2 or FIG. 3.

Example Computer System

Figure 9:
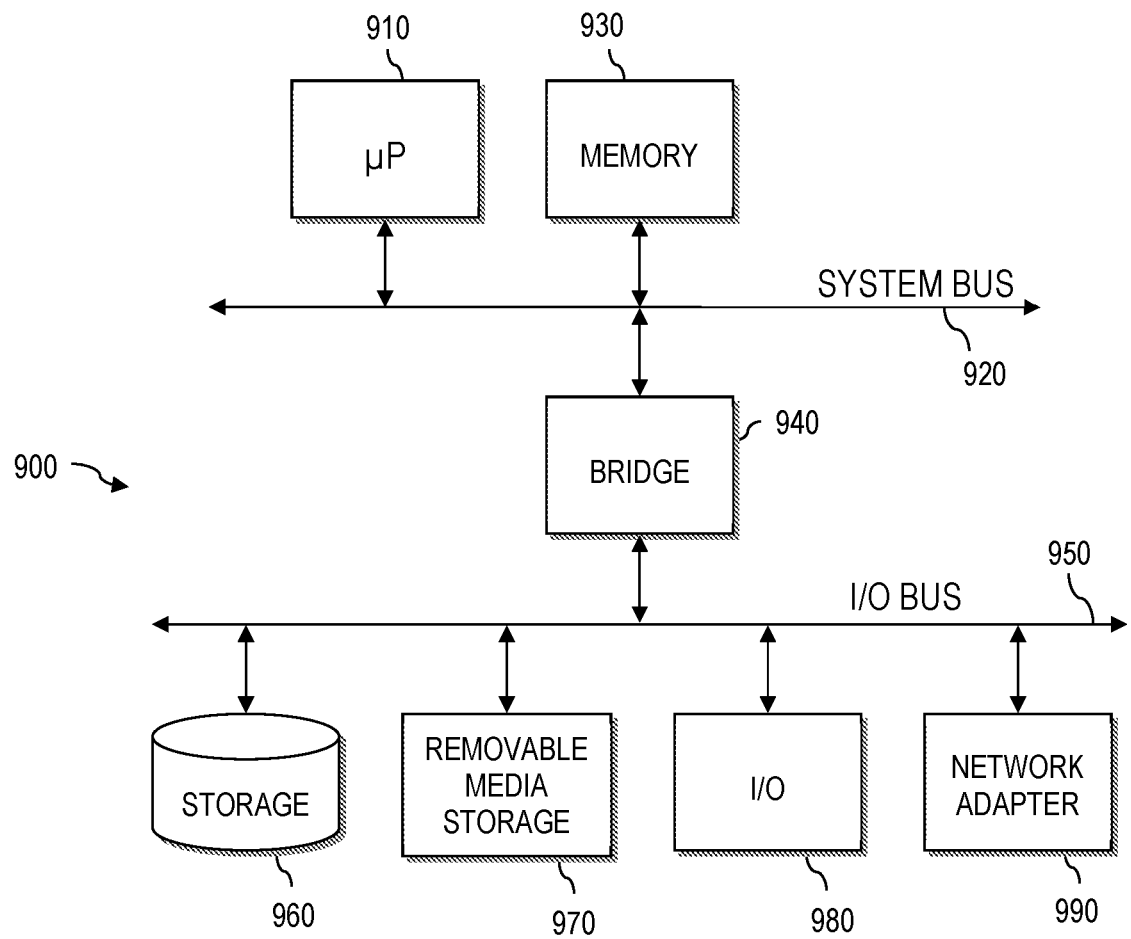
FIG. 9 is a block diagram of a computer system having a computer readable storage medium for implementing functions according to various aspects of the present disclosure as described in greater detail herein.

Referring to FIG. 9, a block diagram of a hardware data processing system is depicted in accordance with the present disclosure. Data processing system 900 may comprise a symmetric multiprocessor (SMP) system or other configuration including a plurality of processors 910 connected to system bus 920. Alternatively, a single processor 910 may be employed. Local memory 930 is also connected to the system bus 920. An I/O bus bridge 940 interfaces the system bus 920 to an I/O bus 950. The I/O bus 950 is utilized to support one or more buses and corresponding devices, such as storage 960, removable media storage 970, input/output devices 980, network adapters 990, other devices, combinations thereof, etc. For instance, a network adapter 990 can be used to enable the data processing system 900 to communicate with other data processing systems or remote printers or storage devices through intervening private or public networks.

The memory 930, storage 960, removable media storage 970, or combinations thereof can be used to store program code that is executed by the processor(s) 910 to implement any aspect of the present disclosure described and illustrated in FIGS. 1-8.

As will be appreciated by one skilled in the art, aspects of the present disclosure may be embodied as a system, process or computer program product. Moreover, some aspects of the present disclosure may be implemented in hardware, in software (including firmware, resident software, microcode, etc.), or by combining software and hardware aspects. Furthermore, aspects of the present disclosure may take the form of a computer program product embodied in one or more computer readable storage medium(s) having computer readable program code embodied thereon.

In certain embodiments, any combination of one or more computer readable medium(s) may be utilized. The computer readable medium may be a computer readable storage medium or a computer readable signal medium. A computer readable storage medium may be a primary storage device, or a secondary storage device (which may be internal, external, or removable from the host hardware processing device). Examples of a computer readable storage medium include, but are not limited to, a portable computer diskette, a hard disk, a random-access memory (RAM), a read-only memory (ROM), an erasable programmable read-only memory (EPROM), Flash memory, a portable compact disc read-only memory (e.g., CD-ROM, CD-R, CD-RW, DVD, Blu-Ray), or any suitable combination of the foregoing. In the context of this document, a computer readable storage medium may be any tangible (hardware) medium that can contain, or otherwise store a program for use by or in connection with an instruction execution system, apparatus, or device.

A computer readable signal medium may include a propagated data signal with computer readable program code embodied therein, for example, in baseband or as part of a carrier wave. Specifically, a computer readable signal medium is not a computer readable storage medium, and a computer readable storage medium is not a computer readable signal medium.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of process, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, process and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A computer-implemented process for cadenced operator interaction in an industrial environment, the process comprising:
    loading into memory an interaction profile that characterizes an operator action that is implemented while operating an industrial vehicle, the interaction profile having:
        a rule defining a measure of performance associated with the operator action; and
        a target operator response to the measure of performance;
    loading into memory, a cadence, where the cadence defines an interval between interactions associated with the operator action of the interaction profile; and
    performing ongoing monitoring by:

monitoring information electronically collected by the industrial vehicle; and performing, responsive to detecting first data within the monitored information corresponding to the operator action:
- applying select components of the monitored information against the rule to define a performance response;
- generating performance feedback based upon a comparison of the performance response to the target operator response;
- saving the performance feedback in a profile history;
- detecting, based upon the cadence, whether an observation event is due; and
- communicating a message of the industrial vehicle based upon the profile history at a time established by the cadence.

2. The process of claim 1, wherein loading into memory the interaction profile, comprises:
- defining the operator action as an operation using a remote control feature of the industrial vehicle;
- defining a start action and an end action of a pattern characterizing an operator interacting with the remote control feature of the industrial vehicle; and
- defining the rule as at least one of a travel distance limit or an operator presence on the industrial vehicle, while using the remote control feature.

3. The process of claim 1, wherein loading into memory the interaction profile, comprises:
- defining the operator action as an operation driving the industrial vehicle;
- defining a start action and an end action of a pattern characterizing an operator interacting with at least one control of the industrial vehicle to drive the industrial vehicle; and
- defining the rule as a function of at least one of travel speed, travel distance, acceleration, or braking.

4. The process of claim 1, wherein loading into memory the interaction profile, comprises:
- defining the operator action as an operation using a load handling feature of the industrial vehicle;
- defining a start action and an end action of a pattern characterizing an operator interacting with at least one control of the industrial vehicle to operate the load handling feature of the industrial vehicle; and
- defining the rule as a function of at least one of lift height or lift weight.

5. The process of claim 1, wherein loading into memory the interaction profile, comprises:
- defining the operator action as an operation using a blending feature of the industrial vehicle;
- defining a start action and an end action of a pattern characterizing an operator interacting with at least one control of the industrial vehicle to operate the blending feature of the industrial vehicle; and
- defining the rule as a function of the blended operational feature.

6. The process of claim 1, wherein loading into memory the interaction profile, comprises:
- defining the operator action as an operation on the industrial vehicle dictated by an environmental procedure;
- defining a start action and an end action of a pattern characterizing an operator interacting with at least one control of the industrial vehicle to operate the industrial vehicle according to the environmental procedure; and
- defining the rule as a function of the environmental procedure.

7. The process of claim 1, wherein loading into memory, the cadence, comprises loading an operator-specific cadence, where the cadence defines an interval between interactions associated with the operator action of the interaction profile that is based upon time.

8. The process of claim 1, wherein loading into memory, the cadence, comprises loading an operator-specific cadence, where the cadence defines an interval between interactions associated with the operator action of the interaction profile that is based upon a predetermined number of encounters with an instance of an event defined by the pattern.

9. The process of claim 1, wherein loading into memory, the cadence, comprises loading an operator-specific cadence, where the cadence defines an interval between interactions associated with the operator action of the interaction profile that is based upon a predetermined number of encounters with an instance of an event defined by the pattern, and a predetermined amount of time.

10. The process of claim 1 further comprising displaying, via a user interface on a display of the industrial vehicle, information related to the operator action of the interaction profile by displaying training information that teaches the operator how to properly perform the operator action to define a correct response and an incorrect response.

11. The process of claim 10 further comprising testing the operator's knowledge of the training information by displaying a question requiring an answer from the operator, where the operator's answer determines whether the operator has knowledge of the correct response.

12. The process of claim 10 further comprising:
outputting to the display, when an observation event is due, a training message that reinforces the training information.

13. The process of claim 10 further comprising:
outputting to the display, when an observation event is due, a positive performance feedback message indicating that the performance response was satisfactory in view of the target operator response.

14. The process of claim 1 further comprising:
outputting to a display on the industrial vehicle, regardless of whether an observation event is due, a negative performance feedback message indicating that the performance response is unsatisfactory in view of the target operator response.

15. The process of claim 1 further comprising:
- increasing the cadence when the performance feedback in the profile history indicates a predetermined number of consecutive correct behaviors; and
- decreasing the cadence when the performance feedback in the profile history indicates an incorrect behavior.

16. A computer-implemented process for vehicle-initiated cadenced operator interaction, the process comprising:
- loading into memory, an interaction profile that is associated with an operator action that is implemented while operating an industrial vehicle, the interaction profile having a rule defining a measure of performance associated with the operator action, and a target operator response to the measure of performance;
- loading into memory, a cadence, where the cadence defines an interval between interactions associated with the operator action of the interaction profile;
- performing ongoing monitoring by:
  - monitoring information communicated across a vehicle network bus;

defining a performance calculation based upon identifying data from the monitored information as satisfying the operator action;
comparing the performance calculation to the target operator response;
generating performance feedback based upon the comparison;
detecting, based upon the cadence, whether an observation event is due; and
outputting the performance feedback when the observation event is due, otherwise suppressing the performance feedback.

17. The process of claim 16 further comprising presenting, before monitoring, an instruction on the operator action that requires operator feedback.

18. The process of claim 16 further comprising:
modifying at least one operational parameter of the industrial vehicle to tune the industrial vehicle performance to the skill of the operator.

19. The process of claim 16, wherein detecting, based upon the cadence, whether an observation event is due comprises adjusting the cadence based upon a desired spacing comprised of a desired temporal spacing, a desired event spacing, or combination thereof.

20. The process of claim 19 further comprising:
setting a minimum value and a maximum value to the desired spacing;
increasing the desired spacing toward the maximum value where the performance feedback results in detecting occurrences of a correct response; and
decreasing the desired spacing toward the minimum value where the performance feedback results in an incorrect response.

21. The process of claim 16, wherein:
loading into memory, the cadence comprises:
detecting by a processor on the industrial vehicle, an identity of the operator; and
determining the cadence for the operator, based upon the interaction profile.

22. A computer-implemented process for providing performance feedback of an industrial vehicle, the process comprising:
loading into memory, an interaction profile that is associated with an operational feature that is implemented while operating the industrial vehicle, the interaction profile having:
a rule defining a measure of performance associated with the operational feature; and
a target operator response to the measure of performance; and
performing ongoing monitoring by:
evaluating the rule by monitoring data communicated across the vehicle bus determined to be associated with the operational feature to define a performance calculation;
outputting a performance feedback when an observation event is due based upon a cadence, wherein the performance feedback is generated based upon a comparison of the performance calculation to the target operator response; and
suppressing the performance feedback when the observation event is not due based upon the cadence.

* * * * *